(12) United States Patent
Nishimura et al.

(10) Patent No.: US 9,804,304 B2
(45) Date of Patent: Oct. 31, 2017

(54) LIGHT-DIFFUSING ELEMENT, POLARIZER HAVING LIGHT-DIFFUSING ELEMENT, AND LIQUID CRYSTAL DISPLAY DEVICE HAVING SAME

(75) Inventors: Akinori Nishimura, Ibaraki (JP); Kozo Nakamura, Ibaraki (JP); Hiroyuki Takemoto, Ibaraki (JP); Takehito Fuchida, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 188 days.

(21) Appl. No.: 13/822,581

(22) PCT Filed: Sep. 16, 2011

(86) PCT No.: PCT/JP2011/071230
§ 371 (c)(1),
(2), (4) Date: Jun. 3, 2013

(87) PCT Pub. No.: WO2012/036271
PCT Pub. Date: Mar. 22, 2012

(65) Prior Publication Data
US 2013/0300980 A1    Nov. 14, 2013

(30) Foreign Application Priority Data

Sep. 17, 2010  (JP) .................. 2010-210128

(51) Int. Cl.
*G02F 1/1335* (2006.01)
*G02B 5/02* (2006.01)
*G02B 5/30* (2006.01)

(52) U.S. Cl.
CPC ............. *G02B 5/02* (2013.01); *G02B 5/0242* (2013.01); *G02B 5/0278* (2013.01); *G02B 5/30* (2013.01); *G02F 1/133504* (2013.01)

(58) Field of Classification Search
CPC ...... G02B 5/02; G02B 5/0242; G02B 5/0278; G02B 5/30; G02F 1/133504
(Continued)

(56) References Cited

U.S. PATENT DOCUMENTS 6,771,336 B2   8/2004  Tatsuta et al.
7,997,743 B2   8/2011  Suzuki et al.
(Continued)

FOREIGN PATENT DOCUMENTS

CN  101602254 A    12/2009
JP  2120702 A  *  5/1990  ............... G02B 5/02
(Continued)

OTHER PUBLICATIONS

Korean Office Action dated May 19, 2014, issued in corresponding Korean Patent Application No. 10-2013-7006558, w/English translation ( 16 pages).
(Continued)

*Primary Examiner* — Nathanael R Briggs
(74) *Attorney, Agent, or Firm* — Westerman, Hattori, Daniels & Adrian, LLP

(57) ABSTRACT

There is provided a light diffusing element made of a thin film capable of realizing low backscattering and a high haze. A light diffusing element according to an embodiment of the present invention includes: a first region having a first refractive index; and a second region having a second refractive index. The first region and the second region form a fine uneven-shaped and spherical shell-shaped boundary.

12 Claims, 16 Drawing Sheets

(58) Field of Classification Search
USPC .................................. 349/64, 112; 359/599
See application file for complete search history.

(56) References Cited

U.S. PATENT DOCUMENTS

| | | | |
|---|---|---|---|
| 8,405,794 | B2 | 3/2013 | Fuchida et al. |
| 2002/0034013 | A1 | 3/2002 | Nakamura et al. |
| 2002/0135714 | A1 | 9/2002 | Tatsuta et al. |
| 2005/0063062 | A1 | 3/2005 | Ito et al. |
| 2006/0227695 | A1 | 10/2006 | Nagaoka |
| 2007/0121227 | A1* | 5/2007 | Wang .................. G02B 5/0231 359/831 |
| 2007/0298193 | A1 | 12/2007 | Nakamura et al. |
| 2009/0051278 | A1 | 2/2009 | Saneto et al. |
| 2009/0052195 | A1 | 2/2009 | Saneto et al. |
| 2010/0039708 | A1* | 2/2010 | Suzuki et al. ................. 359/601 |
| 2010/0259825 | A1* | 10/2010 | Yang et al. ................... 359/599 |
| 2011/0317099 | A1 | 12/2011 | Fuchida et al. |
| 2013/0242395 | A1 | 9/2013 | Nishimura et al. |

FOREIGN PATENT DOCUMENTS

| | | |
|---|---|---|
| JP | 05-013021 A | 1/1993 |
| JP | 6-347617 A | 12/1994 |
| JP | 3-071538 B2 | 7/2000 |
| JP | 3071538 B2 | 7/2000 |
| JP | 2002-212245 A | 7/2002 |
| JP | 2002-214408 A | 7/2002 |
| JP | 2002-328207 A | 11/2002 |
| JP | 2003-262710 A | 9/2003 |
| JP | 2003-307728 A | 10/2003 |
| JP | 2004-038009 A | 2/2004 |
| JP | 2005-4163 A | 1/2005 |
| JP | 2009-070814 A | 4/2009 |
| JP | 2009-244383 A | 10/2009 |
| JP | 2010-077243 A | 4/2010 |
| JP | 2010-107616 A | 5/2010 |
| JP | 2012-083743 A | 4/2012 |
| KR | 10-2009-0019753 A | 2/2009 |
| KR | 10-2009-0039475 A | 4/2009 |
| TW | 200707012 A | 2/2007 |
| TW | 200730886 A | 8/2007 |
| TW | 201011356 A1 | 3/2010 |
| TW | 201037405 A1 | 10/2010 |
| TW | 201038979 A1 | 11/2010 |
| WO | 2006/124588 A1 | 11/2006 |

OTHER PUBLICATIONS

International Search Report for PCT/JP2011/071230, dated Nov. 8, 2011.
Office Action dated Apr. 2, 2014, issued in Taiwanese Patent Application No. 100133553, with English Translation (14 pages).
Chinese Office Action dated Jul. 24, 2014, issued in corresponding Chinese Application No. 201180044550.8; w/English Translation. (21 pages).
Office Action dated May 20, 2015, issued in corresponding Japanese Patent Application No. 2011-202285, with English translation (9 pages).
Extended European Search Report dated Nov. 6, 2015, issued in Counterpart European Application No. 11825269.1 (7 pages).
Basic Characteristics of AEROSIL Fumed Silica, Technical Bulletin Fine Particles, Japan, published in Dec. 1992, No. 11, pp. 1-104, with English translation. Cited in the Japanese Office Action dated Jun. 7, 2017.
Office Action dated Jun. 7, 2017, issued in counterpart Japanese Patent Application No. 2011-202285, with English translation. (23 pages).

* cited by examiner

LIGHT-DIFFUSING ELEMENT, POLARIZER HAVING LIGHT-DIFFUSING ELEMENT, AND LIQUID CRYSTAL DISPLAY DEVICE HAVING SAME

TECHNICAL FIELD

The present invention relates to a light diffusing element, a polarizing plate with a light diffusing element, and a liquid crystal display device using these components.

BACKGROUND ART

A light diffusing element is widely used in illumination covers, screens for projection televisions, surface-emitting devices (for example, liquid crystal display devices), and the like. In recent years, the light diffusing element has been used for enhancing the display quality of liquid crystal display devices and the like and for improving viewing angle properties, for example. As the light diffusing element, for example, there is proposed a light diffusing element in which fine particles are dispersed in a matrix such as a resin sheet (see, for example, Patent Literature 1). In such light diffusing element, most of incident light scatters forward (output plane side), whereas apart thereof scatters backward (incident plane side). As a refractive index difference between each of the fine particles and the matrix becomes larger, diffusibility (for example, a haze value) increases. However, if the refractive index difference is large, backscattering increases. More specifically, there is proposed a technology for placing a light diffusing element on the top surface of a liquid crystal display device so as to enhance the display quality of the liquid crystal display device. However, such light diffusing element does not have sufficient light diffusibility (for example, a haze value of less than 90%), and dose not exert any sufficient effect of improving the display quality. On the other hand, in the case where a light diffusing element having large light diffusibility (for example, a haze value of 90% or more) is used in a liquid crystal display device so as to enhance the display quality, when outside light is incident upon the liquid crystal device, a screen becomes whitish, resulting in a problem in that it is difficult to display a video and an image with a high contrast in a bright place. This is because the fine particles in the light diffusing element cause the incident light to scatter backward as well as forward. According to the conventional light diffusing element, as a haze value becomes larger, backscattering increases. Therefore, it is very difficult to satisfy both the increase in light diffusibility and the suppression of backscattering. Further, in an illumination application, as a haze value becomes larger, backscattering increases and a total light transmittance decreases, which degrades light use efficiency.

As means for solving the above-mentioned problems, based on the concept of suppressing the reflection at an interface between each of the fine particles and the matrix, for example, there are proposed: core-shell fine particles, in which the refractive index of a core is different from that of a shell, and fine particles having gradient refractive indices, such as the so-called gradient index (GRIN) fine particles, in which the refractive index changes continuously from the center of each of the fine particles toward the outer side, are dispersed in a resin (see, for example, Patent Literatures 2 to 8). However, there is a strong requirement for a light diffusing element which is thin and has a high haze value, and a further improvement is demanded.

CITATION LIST

Patent Literature

[PTL 1] JP 3071538 B2
[PTL 2] JP 06-347617 A
[PTL 3] JP 2003-262710 A
[PTL 4] JP 2002-212245 A
[PTL 5] JP 2002-214408 A
[PTL 6] JP 2002-328207 A
[PTL 7] JP 2010-077243 A
[PTL 8] JP 2010-107616 A

SUMMARY OF INVENTION

Technical Problem

The present invention has been achieved so as to solve the conventional problems, and an object of the present invention is to provide a light diffusing element made of a thin film capable of realizing low backscattering and a high haze.

Solution to Problem

A light diffusing element according to an embodiment of the present invention includes: a first region having a first refractive index; and a second region having a second refractive index. The first region and the second region form a fine uneven-shaped and spherical shell-shaped boundary.

A light diffusing element according to another embodiment of the present invention includes: a matrix; and light diffusing fine particles dispersed in the matrix. Two regions having different refractive indices at an interface between the matrix and each of the light diffusing fine particles or in a vicinity thereof form a fine uneven-shaped and spherical shell-shaped boundary.

In one embodiment of the present invention, the matrix includes a resin component and an ultrafine particle component; and the fine uneven-shaped and spherical shell-shaped boundary is formed by a region in the matrix in which the ultrafine particle component is dispersed and a region in the matrix in which the ultrafine particle component is not dispersed.

In one embodiment of the present invention, the fine uneven-shaped and spherical shell-shaped boundary is formed by unevenness of a surface of each of the light diffusing fine particles.

In one embodiment of the present invention, an average primary particle diameter of the ultrafine particle component is 1 nm to 100 nm.

In one embodiment of the present invention, the light diffusing element has a haze of 90% to 99.9%.

In one embodiment of the present invention, the light diffusing element has a thickness of 4 μm to 50 μm.

In one embodiment of the present invention, the light diffusing element has a light diffusion half-value angle of 10° to 150°.

According to another aspect of the present invention, a polarizing plate with a light diffusing element is provided. The polarizing plate with a light diffusing element includes: the above-mentioned light diffusing element; and a polarizer.

According to still another aspect of the present invention, a liquid crystal display device is provided. The liquid crystal display device includes: a liquid crystal cell; a collimated light source device, which is configured to emit collimated light to the liquid crystal cell; and the above-mentioned light diffusing element, which is configured to transmit and diffuse the collimated light passing through the liquid crystal cell.

Advantageous Effects of Invention

According to the present invention, the light diffusing element made of a thin film, which is capable of realizing low backscattering and a high haze, can be obtained through the formation of the fine uneven-shaped and spherical shell-shaped boundary by the first region having the first refractive index and the second region having the second refractive index.

DESCRIPTION OF EMBODIMENTS

Figure 1A:
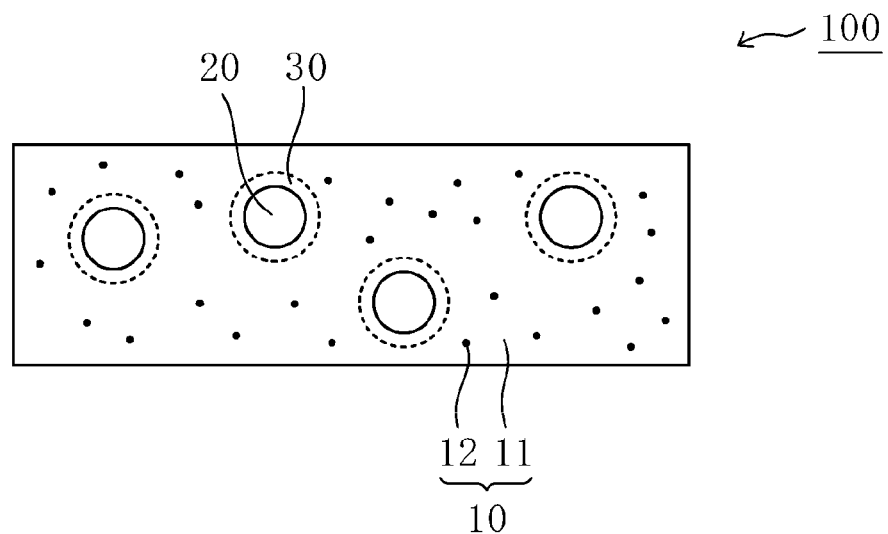
FIG. 1A is a schematic cross-sectional view of a light diffusing element according to a preferred embodiment of the present invention.

Hereinafter, preferred embodiments of the present invention are described with reference to the drawings. However, the present invention is not limited to these specific embodiments.

A. Light Diffusing Element

A-1. Entire Construction

A light diffusing element according to an embodiment of the present invention includes a first region having a first refractive index and a second region having a second refractive index. The light diffusing element of the present embodiment expresses a light diffusing function by virtue of the refractive index difference between the first region and the second region. In the present invention, the first region and the second region form a fine uneven-shaped and spherical shell-shaped boundary. Accordingly, the light diffusing element of the present embodiment has such an external appearance that the first region surrounded by the fine uneven-shaped and spherical shell-shaped boundary is dispersed in the second region. The size of the fine unevenness of the boundary is preferably equal to or smaller than the wavelength of light. That is, through the formation of the fine uneven-shaped boundary whose size is equal to or smaller than the wavelength of light between the first region and second region having different refractive indices, there is formed a substantial refractive index modulation region in accordance with the height of the unevenness.

The first region, the second region, and the boundary (substantial refractive index modulation region) may each be formed by any suitable means. Examples thereof include the following means. (1) Refractive index gradient fine particles (e.g., so-called GRIN fine particles), in which the refractive index changes continuously from the center portion of each of the fine particles toward its outside, are formed so as for the periphery of a refractive index gradient portion to have an uneven shape, and the fine particles are dispersed in a resin. In this case, the uneven refractive index gradient portion corresponds to the boundary. In addition, the periphery may be rendered uneven-shaped by, for example, treating the surfaces of the fine particles with a solvent. (2) A resin component and an ultrafine particle component are used in a matrix, and two regions having different refractive indices at an interface between the matrix and the light diffusing fine particle or in the vicinity thereof form a fine uneven-shaped and spherical shell-shaped boundary by a substantial gradient of the dispersion concentration of the ultrafine particle component. Hereinafter, an embodiment in which the resin component and the ultrafine particle component are used in the matrix is mainly described, and any other embodiment is briefly described for only its characteristic portion.

In one embodiment, the light diffusing element of the present invention includes a matrix and light diffusing fine particles dispersed in the matrix. The light diffusing element according to this embodiment expresses a light diffusing function on the basis of a difference in refractive index between the matrix and each of the light diffusing fine particles. In this embodiment, two regions having different refractive indices at an interface between the matrix and each of the light diffusing fine particles or in the vicinity thereof form a fine uneven-shaped and spherical shell-shaped boundary. The size of the fine unevenness of the boundary is preferably equal to or smaller than the wavelength of light. That is, through the formation of the fine uneven-shaped boundary whose size is equal to or smaller than the wavelength of light between the two regions having different refractive indices, a substantial refractive index modulation region in accordance with the height of the unevenness is formed at the interface between the matrix and each of the light diffusing fine particles or in the vicinity thereof. The term "interface between the matrix and each of the light diffusing fine particles or in the vicinity thereof" as used herein comprehends the surface of each of the light diffusing fine particles, an external portion in the vicinity of the surface, and an inner portion in the vicinity of the surface. That is: a fine uneven-shaped boundary derived from the surface properties of the light diffusing fine particles may be formed at the interface between each of the light diffusing fine particles having a fine uneven-shaped surface and the matrix having a refractive index different from that of each of the light diffusing fine particles; the surface of the light diffusing fine particle may have a fine uneven shape as a result of the dissolution and corrosion of the surface of each of the light diffusing fine particles by the matrix, and a fine uneven-shaped boundary derived from the properties of the surface may be formed; an interface between two regions having different refractive indices may be present in an inner portion of each of the light diffusing fine particles, and the interface may form a fine uneven-shaped boundary; an interface between two regions having different refractive indices may be present in the matrix in the external portion in the vicinity of the surface of each of the light diffusing fine particles, and the interface may form a fine uneven-shaped boundary. When the two regions having different refractive indices at the interface between the matrix and each of the light diffusing fine particles or in the vicinity thereof form the fine uneven-shaped boundary, and thus the refractive index changes substantially continuously, the matrix substantially includes the refractive index modulation region at the interface with each of the light diffusing fine particles or in the vicinity thereof, and a refractive index constant region on the outside thereof. In the refractive index modulation region, the refractive index changes substantially continuously. The phrase "refractive index changes substantially continuously" as used herein means that, in the refractive index modulation region, the refractive index has only to change substantially continuously at least from the surface of each of the light diffusing fine particles to the refractive index constant region.

Figure 1B:
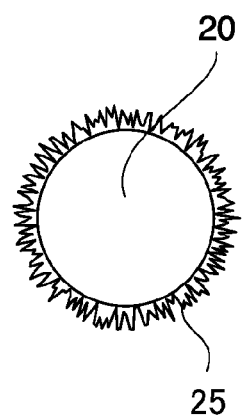
FIG. 1B is a schematic view for illustrating a refractive index modulation region by a fine uneven-shaped boundary formed in the vicinity of the surface of a light diffusing fine particle.
Figure 1C:
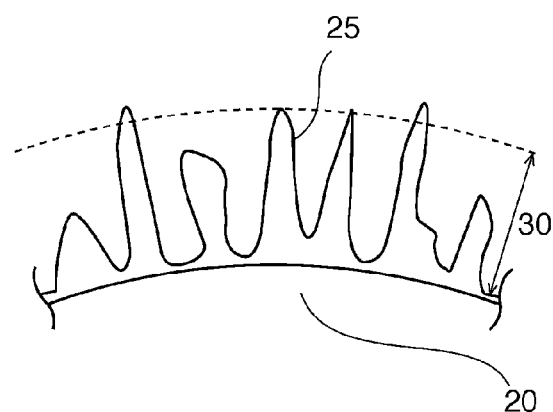
FIG. 1C is a schematic view for illustrating details of the fine uneven-shaped boundary of FIG. 1B.
Figure 1D:
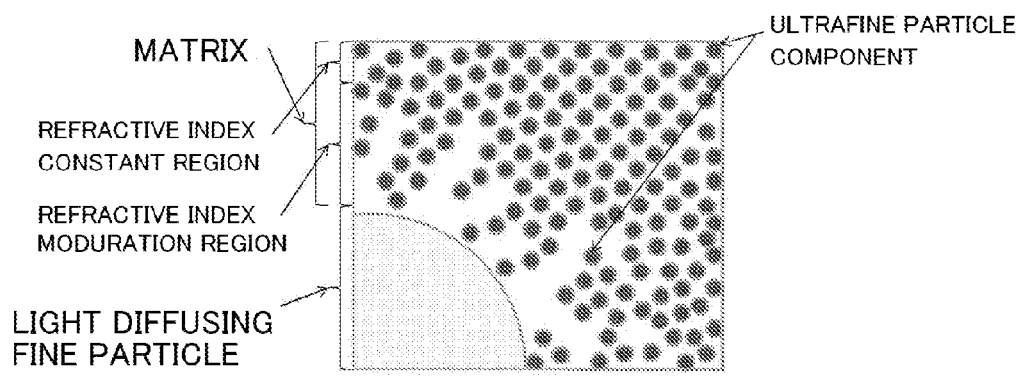
FIG. 1D is a schematic view for illustrating such a state of a matrix that the fine uneven-shaped boundary of FIG. 1B can be formed.

FIG. 1A is a schematic cross-sectional view of the light diffusing element according to this embodiment, FIG. 1B is a schematic view for illustrating the refractive index modulation region by the fine uneven-shaped boundary formed in the vicinity of the surface of each of the light diffusing fine particles, FIG. 1C is a schematic view for illustrating details of the fine uneven-shaped boundary of FIG. 1B, and FIG. 1D is a schematic view for illustrating such a state of the matrix that the fine uneven-shaped boundary of FIG. 1B can be formed. The matrix preferably includes a resin component and an ultrafine particle component. A light diffusing element 100 of FIG. 1A includes a matrix 10 including a resin component 11 and an ultrafine particle component 12, and light diffusing fine particles 20 dispersed in the matrix 10. It is preferred that, in the vicinity of the interface between the matrix and each of the light diffusing fine particles, a boundary between a region in which the ultrafine particle component is dispersed and a region in which the ultrafine particle component is not dispersed be present in the matrix 10 and the boundary be fine uneven-shaped. In this embodiment, as illustrated in FIG. 1A, a refractive index modulation region 30 is formed in an external portion in the vicinity of the interface between the matrix and the light diffusing fine particle. As illustrated in FIG. 1B and FIG. 1C, the refractive index modulation region 30 expresses a refractive index modulating function on the basis of a fine uneven-shaped boundary 25 as described above. As described above, in the refractive index modulation region 30, the refractive index changes substantially continuously. In addition, the fine uneven-shaped boundary 25 is formed at the interface between the matrix and each of the light diffusing fine particles or in the vicinity thereof, and hence is substantially spherical shell-shaped. It should be noted that, in this embodiment, the light diffusing fine particles and the region in the matrix in which the ultrafine particle component is not dispersed correspond to the first region, and the region in the matrix in which the ultrafine particle component is dispersed corresponds to the second region.

As illustrated in FIG. 1B and FIG. 1C, the fine uneven-shaped boundary is preferably such that the pitches of its unevenness, the depths of its recessed portions or the heights of its protruded portions, and the shapes of the recessed portions and the protruded portions are nonuniform. The formation of such nonuniform unevenness structure in the vicinity of the interface between the matrix and the light diffusing fine particle allows the refractive index modulation region to be formed satisfactorily. The average height of the unevenness of the fine uneven-shaped boundary is preferably 10 nm to 500 nm, more preferably 10 nm to 60 nm. The average pitch of the fine uneven-shaped boundary is preferably 100 nm or less, more preferably 50 nm or less, still more preferably 30 nm or less. The lower limit of the average pitch is preferably 5 nm, more preferably 10 nm. Such average pitch and average height allow the refractive index to change substantially continuously in the refractive index modulation region and can steepen the gradient of the refractive index change. As a result, there can be obtained a light diffusing element made of a thin film, which has a high haze value and strong diffusibility and in which backscattering is suppressed. The term "average pitch" as used herein refers to the statistical average of horizontal distances between the apexes of protruded portions adjacent to each other in a predetermined range, and the term "average height" refers to the statistical average of the heights (vertical distances from bottoms to apexes) of the protruded portions in the predetermined range. Such fine uneven-shaped boundary as described above has, for example, a group of conical and/or needle-shaped fine protrusions protruding from the light diffusing fine particle toward the matrix as illustrated in FIG. 1C (It should be noted that even when viewed from the matrix side, the fine uneven-shaped boundary similarly has a group of conical and/or needle-shaped fine protrusions protruding toward the light diffusing fine particle). Through the formation of such fine uneven-shaped boundary, there can be obtained a light diffusing element having a low reflectance.

Figure 2A:
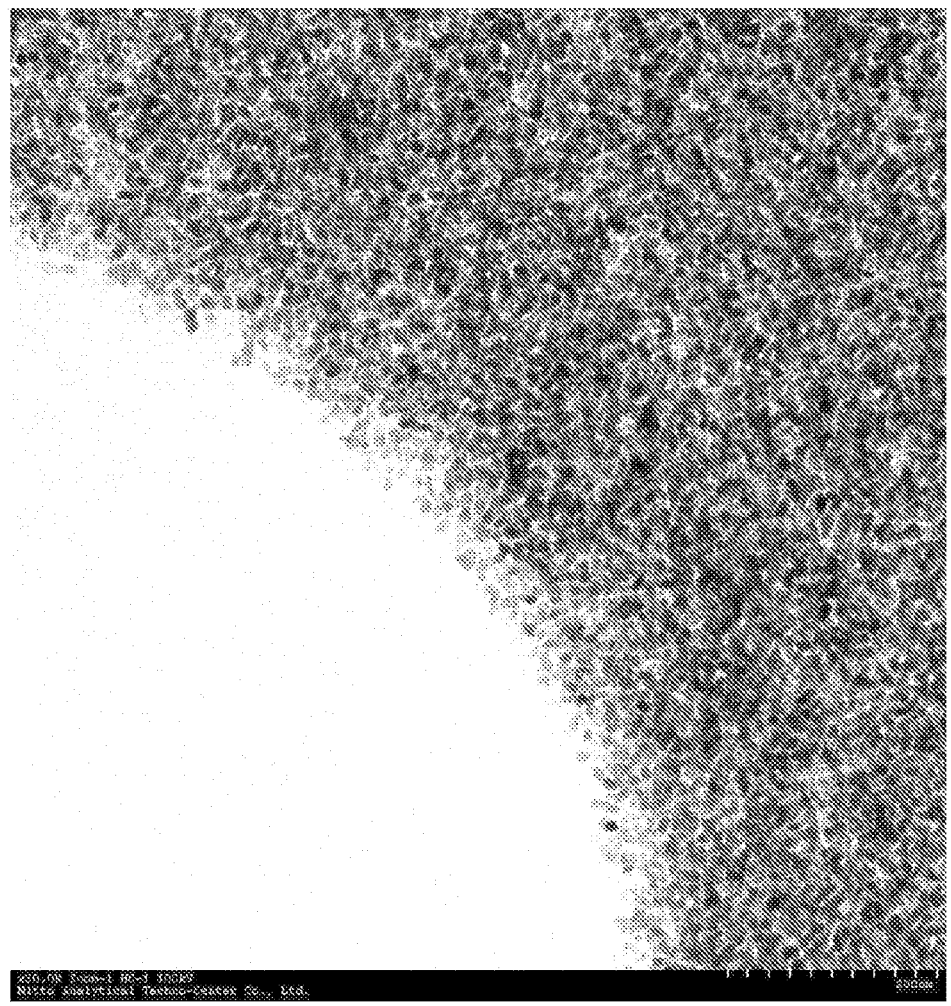
FIG. 2A is a TEM image for showing the dispersed state of an ultrafine particle component in the vicinity of a light diffusing fine particle in the light diffusing element according to a preferred embodiment of the present invention.
Figure 2B:
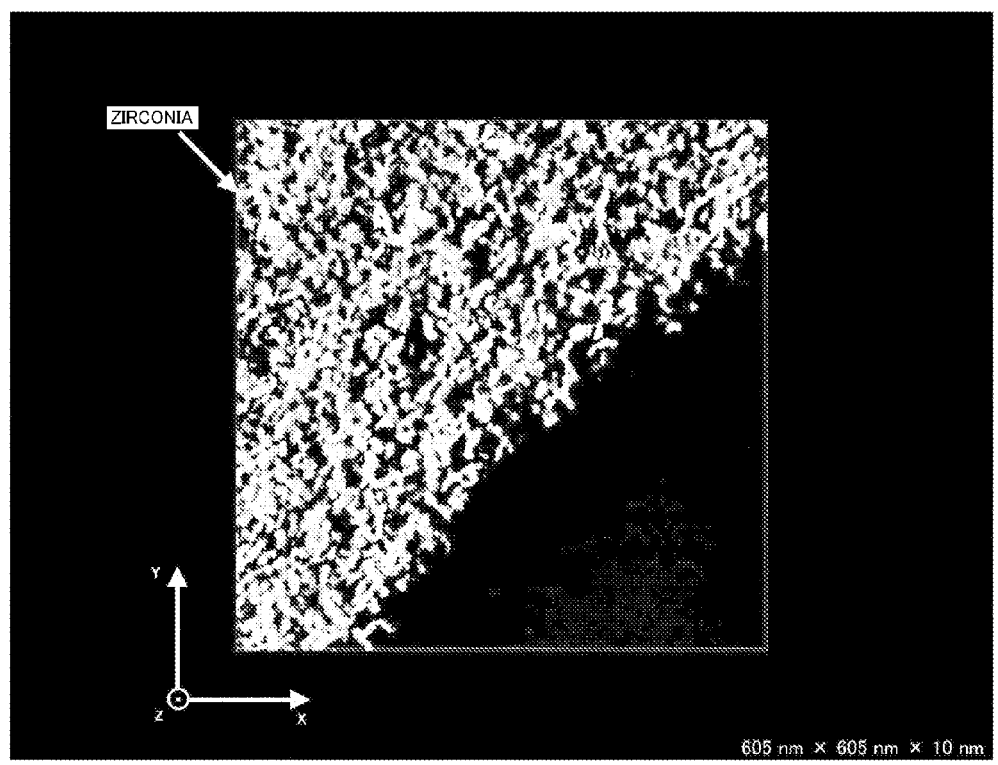
FIG. 2B is a three-dimensional image reconstructed from the TEM image of FIG. 2A viewed from one direction.
Figure 2C:
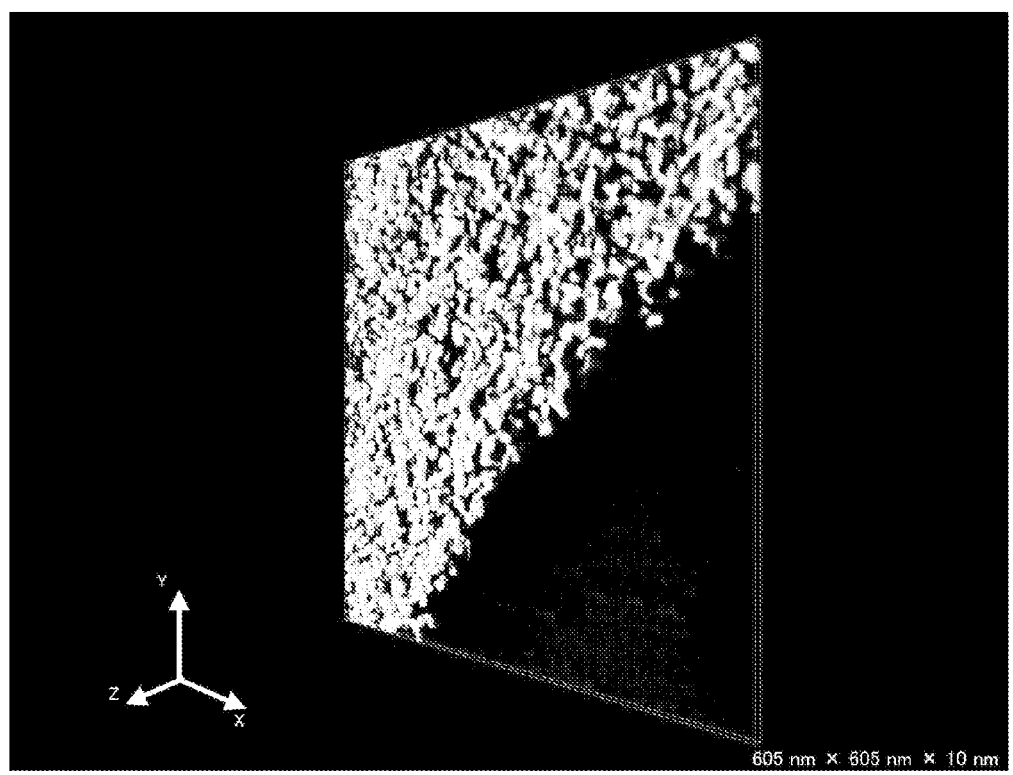
FIG. 2C is a three-dimensional image reconstructed from the TEM image of FIG. 2A viewed from another direction.
Figure 2D:
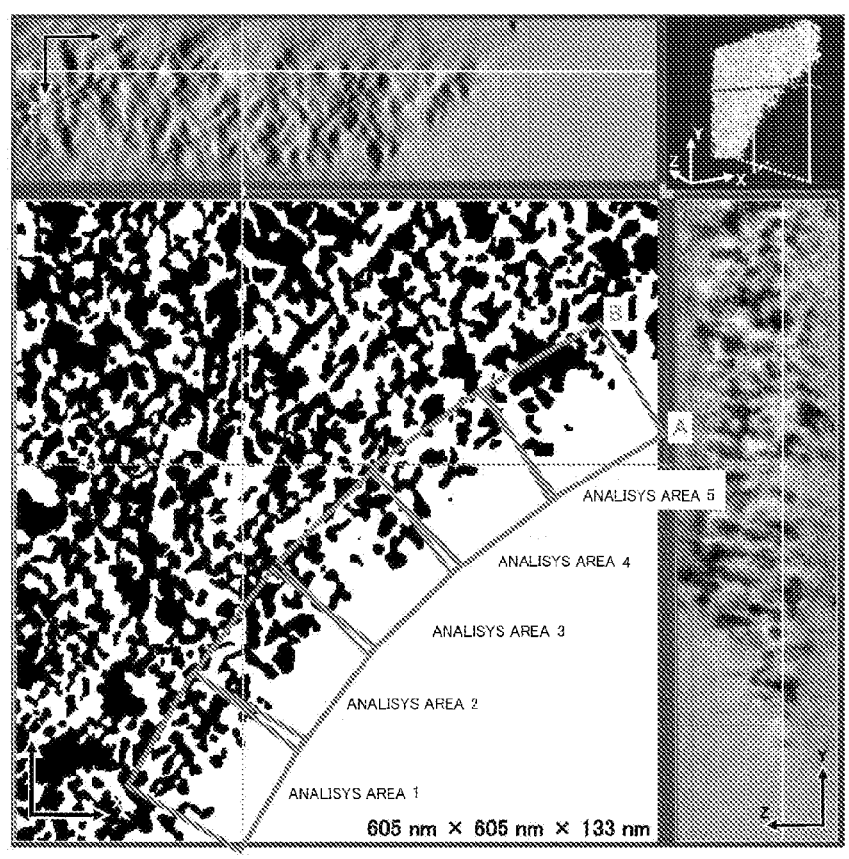
FIG. 2D is a binarized image of the three-dimensional reconstructed image of FIG. 2B, for showing a method of calculating the dispersion concentration (presence ratio) of the ultrafine particle component in the vicinity of an interface between a matrix and the light diffusing fine particle.
Figure 2E:
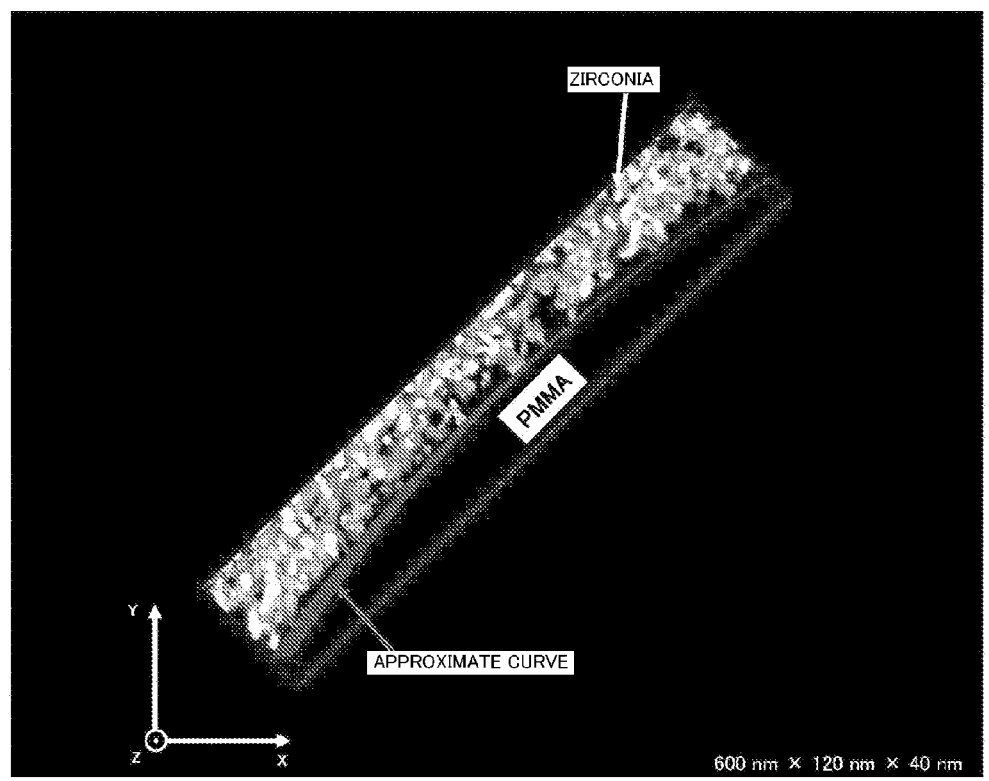
FIG. 2E is a three-dimensional reconstructed image for showing a method of determining the average pitch of the unevenness of a fine uneven-shaped boundary and the average height of the unevenness from the three-dimensional reconstructed images of FIG. 2B and FIG. 2C.
Figure 3:
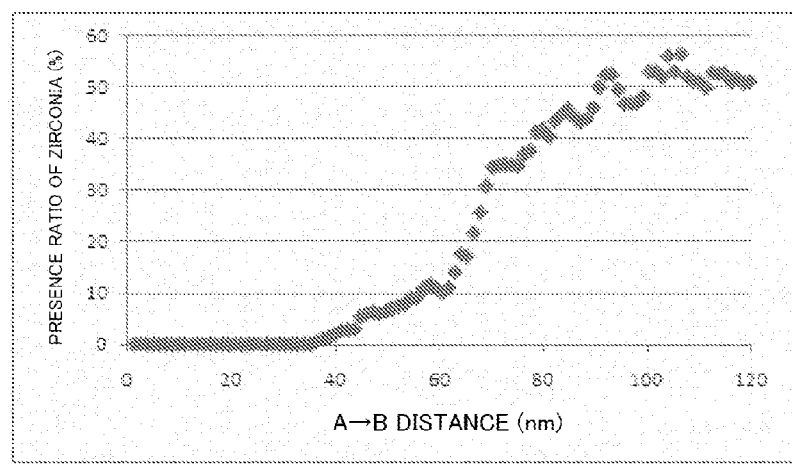
FIG. 3 is a graph showing a relationship between a distance from the surface of the light diffusing fine particle and the dispersion concentration (presence ratio) of the ultrafine particle component in the light diffusing element according to a preferred embodiment of the present invention.

As described above, the matrix 10 preferably includes the resin component 11 and the ultrafine particle component 12. It is preferred that, as illustrated in FIG. 1D, a region in the matrix 10 in which the ultrafine particle component 12 is dispersed and a region in the matrix 10 in which the ultrafine particle component 12 is not dispersed form the fine uneven-shaped boundary and a substantial gradient of the dispersion concentration of the ultrafine particle component be formed in the vicinity of the interface between the matrix and each of the light diffusing fine particles. In this connection, although the refractive index modulating function may be expressed by virtue of the shape of the entirety of the fine uneven-shaped boundary, the dispersion concentration of the ultrafine particle component may form a substantial gradient in each protrusion of the group of protrusions at the boundary as well when viewed in an additionally microscopic manner. Hereinafter, the gradient of the dispersion concentration of the ultrafine particle component at the boundary is described with transmission electron microscope (TEM) images. FIG. 2A is a two-dimensional TEM image showing the dispersed state of an ultrafine particle component in the vicinity of a light diffusing fine particle, FIG. 2B and FIG. 2C are three-dimensional images reconstructed from the TEM image of FIG. 2A viewed from directions different from each other, and FIG. 2D is a binarized image of the three-dimensional reconstructed image of FIG. 2B. FIG. 3 is a graph showing a relationship between a distance from the surface of a light diffusing fine particle and the dispersion concentration (presence ratio) of the ultrafine particle component calculated from the TEM images of FIG. 2A to FIG. 2C. The graph of FIG. 3 is a graph prepared by dividing the portion in the vicinity of the interface between the matrix and the light diffusing fine particle of FIG. 2D into five analysis areas, subjecting each of the five analysis areas to image processing, calculating a relationship between a distance from the surface of the light diffusing fine particle and the dispersion concentration (presence ratio) of the ultrafine particle component in each of the analysis areas, and averaging the calculated values. As shown in FIG. 2A to FIG. 2C, according to the fine uneven-shaped boundary, as a distance from the refractive index constant region of the matrix 10 becomes larger, the ratio of the region in which the ultrafine particle component 12 is not dispersed (or region in which the dispersion concentration is low) increases. It is preferred that, as shown in FIG. 3, the gradient of the concentration change of the dispersion concentration of the ultrafine particle component be small on a side close to the light diffusing fine particle 20 and be large on a side close to the refractive index constant region, and the dispersion concentration change while forming a substantial gradient from the side of the light diffusing fine particle to the side of the refractive index constant region. In other words, the gradient of the concentration change of the dispersion concentration of the ultrafine particle component 12 increases as the distance from the light diffusing fine particle becomes larger. In one embodiment, as shown in FIG. 2D, the fine uneven-shaped boundary has a group of conical and/or needle-shaped fine protrusions protruding from the light diffusing fine particle toward the matrix. In FIG. 2D, A indicates a position corresponding to the surface of the light diffusing fine particle and B indicates a position corresponding to an interface between the refractive index modulation region and the refractive index constant region. It should be noted that the average pitch of the unevenness of the fine uneven-shaped boundary as described above and the average height of the unevenness can be calculated as described below. As shown in FIG. 2E, the interface (actual interface) between the light diffusing fine particle and the matrix is sampled from such three-dimensional reconstructed images as shown in FIG. 2B and FIG. 2C, the actual interface is subjected to fitting with an approximate curve, and the average pitch and the average height are calculated from distances between protruded portions each protruding from the approximate curve by 30 nm or more at the actual interface and the average height of the protruded portions. As described above, according to this embodiment, the refractive index modulation region 30 can be obtained through the formation, by an isoconcentration interface of the ultrafine particle component 12, of the fine uneven-shaped boundary at the interface between the matrix and each of the light diffusing fine particles or in the vicinity thereof and the formation of the substantial gradient of the dispersion concentration of the ultrafine particle component. Accordingly, the light diffusing element can be manufactured by a simple procedure and at low cost. In addition, the formation of the refractive index modulation region through the utilization of the substantial gradient of the dispersion concentration of the ultrafine particle component allows the refractive index to change smoothly at the boundary between the refractive index modulation region 30 and refractive index constant region. In addition, the use of the ultrafine particle component having a refractive index significantly different from those of the resin component and the light diffusing fine particles can enlarge the difference in refractive index between each of the light diffusing fine particles and the matrix (substantially the refractive index constant region) and steepen the refractive index gradient of the refractive index modulation region. As a result, there can be obtained a light diffusing element made of a thin film, which has a high haze value and strong diffusibility and in which backscattering is suppressed.

The fine uneven-shaped boundary as described above can be formed by appropriately selecting materials for forming the resin component and the ultrafine particle component of the matrix, and the light diffusing fine particles, and chemical and thermodynamic properties. For example, by forming the resin component and the light diffusing fine particles through use of materials of the same type (for example, organic compounds), and forming the ultrafine particle component through use a material (for example, an inorganic compound) of a different type from those of the resin component and the light diffusing fine particles, the refractive index modulation region can be formed satisfactorily. Further, for example, it is preferred that the resin component and the light diffusing fine particles be formed of materials having high compatibility with each other among the materials of the same type. The thickness and refractive index gradient of the refractive index modulation region can be controlled by adjusting the chemical and thermodynamic properties of the resin component and the ultrafine particle component of the matrix, and the light diffusing fine particles. It should be noted that the term "same type" as used herein means that chemical structures and properties are equivalent or similar, and the term "different type" refers to a type other than the same type. Whether or not materials are of the same type varies depending upon the way of selecting a standard. For example, based on whether materials are organic or inorganic, organic compounds are compounds of the same type, and an organic compound and an inorganic compound are compounds of different types. Based on a repeating unit of a polymer, for example, an acrylic polymer and an epoxy-based polymer are compounds of different types in spite of the fact that they are both organic compounds. Based on the periodic table, an alkaline metal and a transition metal are elements of different types in spite of the fact that they are both inorganic elements.

More specifically, the substantial gradient of dispersion concentration of the ultrafine particle component as described above can be realized by the following method (1) or (2), or an appropriate combination thereof: (1) The dispersion concentration of the ultrafine particle component in the matrix is adjusted. For example, by increasing the dispersion concentration of the ultrafine particle component, electrical repulsion between the ultrafine particle components becomes large. As a result, the ultrafine particle component ends up being present even in the vicinity of each of the light diffusing fine particles, and a steep refractive index gradient can be formed in the refractive index modulation region (thickness of the refractive index modulation region becomes small). (2) The cross-linking degree of the light diffusing fine particles is adjusted. For example, in light diffusing fine particles with a low cross-linking degree, a degree of freedom of constituent polymer molecules on the surfaces of the fine particles becomes high, and hence, the ultrafine particle component cannot approach the light diffusing fine particles easily. As a result, a gentle refractive index gradient can be formed in the refractive index modulation region (thickness of the refractive index modulation region becomes large). Preferably, by appropriately combining the methods (1) and (2), the substantial gradient of dispersion concentration of the ultrafine particle component as described can be realized. For example, by using an ultrafine particle component of zirconia and light diffusing fine particles of PMMA, setting the dispersion concentration of the ultrafine particle component to 30 parts by weight to 70 parts by weight with respect to 100 parts by weight of the matrix, and using light diffusing fine particles with a swelling degree of 100% to 200% with respect to a resin component precursor described later, there can be realized a dispersion concentration gradient in which the dispersion concentration of the ultrafine particle component 12 in the matrix 10 is small on a side close to the light diffusing fine particles 20 and large on a side close to the refractive index constant region, and changes while forming a substantial gradient from the light diffusing fine particle side to the refractive index constant region side. Further, there can be formed a refractive index modulation region (for example, as in an outer shape of confetti) in which the thickness varies depending upon the position of the surface of the light diffusing fine particle. Herein, the term "swelling degree" refers to a ratio of an average particle diameter of each of the particles in a swollen state with respect to the average particle diameter of each of the particles before being swollen.

The average thickness L of the refractive index modulation region 30 is preferably 10 nm to 500 nm, more preferably 12 nm to 400 nm, still more preferably 15 nm to 300 nm. According to the present embodiment, although the refractive index modulation region has a remarkably small thickness as compared to conventional GRIN fine particles, the difference in refractive index between each of the light diffusing fine particles and the matrix can be enlarged (a refractive index gradient can be steepened), and the refractive index can be changed substantially continuously in the refractive index modulation region. It should be noted that the average thickness L is the thickness of a region in which the refractive index changes, the region ranging from the vicinity of the surface of the light diffusing fine particle to the refractive index constant region.

Figure 4:
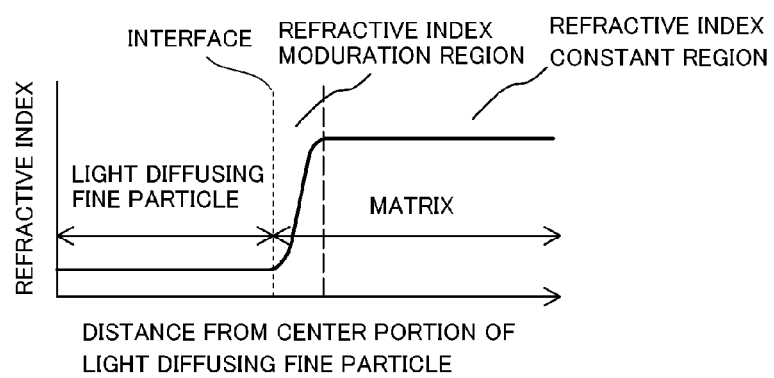
FIG. 4 is a conceptual diagram for illustrating a change in refractive index from a center portion of the light diffusing fine particle to a matrix in the light diffusing element of the present invention.

As described above, preferably, in the refractive index modulation region 30, the refractive index changes substantially continuously. More preferably, in addition to this, a refractive index in an outermost portion of the refractive index modulation region and a refractive index of the refractive index constant region are substantially identical. In other words, in the light diffusing element according to this embodiment, the refractive index changes continuously from the refractive index modulation region to the refractive index constant region, and preferably, the refractive index changes continuously from the light diffusing fine particle to the refractive index constant region (FIG. 4). Preferably, the change in refractive index is smooth as illustrated in FIG. 4. That is, the refractive index changes in such a shape that a tangent can be drawn on a refractive index change curve in a boundary between the refractive index modulation region and the refractive index constant region. Preferably, in the refractive index modulation region, the gradient of the change in refractive index increases with increasing distance from the light diffusing fine particle. According to this embodiment, as described later, by appropriately selecting the light diffusing fine particles, and the resin component and the ultrafine particle component of the matrix, a substantially continuous change in refractive index can be realized. One of the features of the present invention lies in that the change in refractive index, which is steep as described above and which is substantially continuous, is realized. As a result, even when a refractive index difference between the matrix 10 (substantially, the refractive index constant region) and the light diffusing fine particles 20 is increased, reflection at an interface between the matrix 10 and each of the light diffusing fine particles 20 can be suppressed, and backscattering can be suppressed. Further, in the refractive index constant region, the weight concentration of the ultrafine particle component 12 the refractive index of which is largely different from that of each of the light diffusing fine particles 20 is relatively high, and hence, the refractive index difference between the matrix 10 (substantially, the refractive index constant region) and each of the light diffusing fine particles 20 can be increased. As a result, even a thin film can realize a high haze (strong diffusibility). Thus, according to the light diffusing element according to this embodiment, the refractive index difference can be increased to realize a high haze and backscattering can be suppressed remarkably. Such feature is particularly suitable in an application that requires strong diffusibility (haze of 90% or more) such as a light diffusing element used in a collimated backlight front diffusing system. On the other hand, according to the conventional light diffusing element having formed therein no refractive index modulation region, when an attempt is made to impart strong diffusibility (high haze value) by increasing a refractive index difference, the gap between refractive indices at an interface cannot be eliminated. Consequently, backscattering caused by reflection at an interface between a light diffusing fine particle and a matrix increases, which often results in that a black display may not become black sufficiently (that is, a black color may get out of harmony) in the presence of outside light. According to an embodiment of the present invention, by forming the fine uneven-shaped boundary as described above, and consequently forming the refractive index modulation region the refractive index of which changes substantially continuously, the above-mentioned problems in the related art can be solved, and a light diffusing element made of a thin film can be obtained, which has a high haze value and strong diffusibility and in which backscattering is suppressed.

Figure 5:
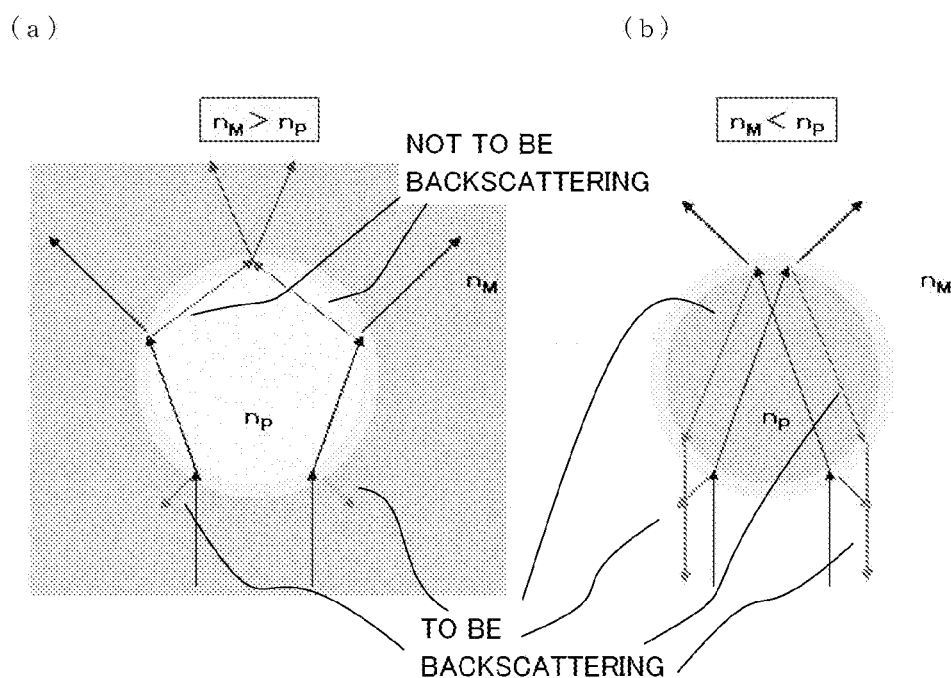
FIG. 5(a) is a conceptual diagram for illustrating a mechanism for the occurrence of backscattering in the case where the relationship of "average refractive index $n_M$ of matrix>refractive index $n_P$ of light diffusing fine particle" is satisfied.
FIG. 5(b) is a conceptual diagram for illustrating a mechanism for the occurrence of backscattering in the case where $n_M < n_P$.

In the light diffusing element according to this embodiment, it is preferred that the average refractive index $n_M$ of the matrix be larger than the refractive index $n_P$ of the light diffusing fine particle ($n_M > n_P$). As illustrated in FIG. 5(a) and FIG. 5(b) for comparison, in the case where $n_M > n_P$, as compared to the case where $n_M < n_P$, backscattering can be suppressed more satisfactorily even when the refractive index gradient of the refractive index modulation region is steep. $\Delta n$ ($=n_M - n_P$) is preferably 0.08 or more, more preferably 0.10 or more. The upper limit of $\Delta n$ is preferably 0.2.

The light diffusion property of the light diffusing element of the present embodiment is typically expressed by a haze and a light diffusion half-value angle. The haze indicates intensity of light diffusion, that is, a diffusion degree of incident light. On the other hand, the light diffusion half-value angle indicates quality of diffusion light, that is, an angle range of light to be diffused. The light diffusing element of the present embodiment exhibits its effects sufficiently when the haze is high. The haze of the light diffusing element is preferably 90% to 99.9%, more preferably 92% to 99.9%, still more preferably 95% to 99.9%, particularly preferably 97% to 99.9%. When the haze is 90% or more, the light diffusing element can be suitably used as a front light diffusing element in a collimated backlight front diffusing system. According to an embodiment of the present invention, a light diffusing element which has a very high haze and in which backscattering is suppressed as described above can be obtained. It should be noted that the collimated backlight front diffusing system refers to a system in which a front light diffusing element is provided on a viewer side of an upper polarizing plate, using collimated backlight (backlight with a narrow brightness half-width (e.g., 3° to 35° or ±1.5° to)±17.5° condensed in a predetermined direction) in a liquid crystal display device. The haze can be determined in accordance with JIS 7136.

The light diffusion property of the light diffusing element is preferably 10° to 150° (5° to 75° on one side), more preferably 10° to 100° (5° to 50° on one side), still more preferably 30° to 80° (15° to 40° on one side) in terms of a light diffusion half-value angle. When the light diffusion half-value angle is too small, an oblique viewing angle (for example, white brightness) may become narrow in some cases. When the light diffusion half-value angle is too large, backscattering may become large in some cases.

It is preferred that the light diffusing element have a lowest possible backscattering ratio. Specifically, the backscattering ratio is preferably 0.5% or less.

The thickness of the light diffusing element can be set appropriately depending upon purposes and desired diffusion property. Specifically, the thickness of the light diffusing element is preferably 4 μm to 50 μm, more preferably 4 μm to 20 μm. According to an embodiment of the present invention, a light diffusing element having a very high haze (excellent light diffusibility) as described above in spite of such very small thickness can be obtained. Further, with such small thickness, the light diffusing element is not cracked even when it is bent, and can be stored in a roll shape. In addition, as described later, the light diffusing element of the present embodiment can be formed by application, and hence, for example, the production of the light diffusing element and the attachment thereof to a polarizing plate can be performed continuously through so-called roll-to-roll. Thus, the light diffusing element of the present embodiment is very excellent in productivity of the light diffusing element itself and has very high production efficiency of attachment to other optical members such as a polarizing plate. The roll-to-roll refers to a process of attaching long films to each other continuously with their longitudinal directions being aligned while conveying the films with rolls.

The light diffusing element is used preferably in a liquid crystal display device, particularly preferably in a liquid crystal display device employing a collimated backlight front diffusing system. The light diffusing element may be provided as a film-shaped or plate-shaped member alone, or may be attached to any appropriate base material or polarizing plate and provided as a composite member. Further, a reflection preventing layer may be laminated on the light diffusing element.

A-2. Matrix

As described above, the matrix 10 preferably includes the resin component 11 and the ultrafine particle component 12. As described above and as illustrated in FIGS. 1A and 1B, the ultrafine particle component 12 is dispersed in the resin component 11 so as to form the refractive index modulation region 30 in the vicinity of the interface between the matrix 10 and the light diffusing fine particle 20.

A-2-1. Resin Component

The resin component 11 is formed of any suitable material as long as the fine uneven-shaped boundary as described above (and consequently, the refractive index modulation region) is formed. Preferably, as described above, the resin component 11 is formed of a compound that is of the same type as that of each of the light diffusing fine particles and that is of a different type from that of the ultrafine particle component. With this, the refractive index modulation region can be formed satisfactorily in the vicinity of the interface between the matrix and each of the light diffusing fine particles (in the vicinity of the surface of each of the light diffusing fine particles). More preferably, the resin component 11 is formed of a compound having high compatibility with each of the light diffusing fine particles, among those of the same type. With this, the refractive index modulation region having a desired gradient of the refractive index can be formed.

The resin component is formed of preferably an organic compound, more preferably an ionizing radiation-curable resin. The ionizing radiation-curable resin is excellent in hardness of an applied film, and hence easily compensates for mechanical strength, which is a weak point of the ultrafine particle component described later. Examples of the ionizing radiation include UV light, visible light, infrared light, and an electron beam. Of those, UV light is preferred, and thus, the resin component is particularly preferably formed of a UV-curable resin. Examples of the UV-curable resin include resins formed of radical-polymerizable monomers and/or oligomers such as an acrylate resin (epoxy acrylate, polyester acrylate, acrylic acrylate, or ether acrylate). A monomer component (precursor) that constructs the acrylate resin preferably has a molecular weight of 200 to 700. Specific examples of the monomer component (precursor) that constructs the acrylate resin include pentaerythritol triacrylate (PETA, molecular weight: 298), neopentylglycol diacrylate (NPGDA, molecular weight: 212), dipentaerythritol hexaacrylate (DPHA, molecular weight: 632), dipentaerythritol pentaacrylate (DPPA, molecular weight: 578), and trimethylolpropane triacrylate (TMPTA, molecular weight: 296). If required, an initiator may be added to the precursor. Examples of the initiator include a UV radial generator (e.g., Irgacure 907, 127, or 192 manufactured by BASF Japan Ltd.) and benzoyl peroxide. The resin component may contain another resin component other than the ionizing radiation-curable resin. The another resin component may be an ionizing radiation-curable resin, a thermosetting resin, or a thermoplastic resin. Typical examples of the another resin component include an aliphatic (for example, polyolefin) resin and a urethane-based resin. In the case of using the another resin component, the kind and blending amount thereof are adjusted so that the refractive index modulation region is formed satisfactorily.

The resin component typically satisfies the following expression (1):

$$|n_P - n_A| < |n_P - n_B| \quad (1)$$

in the formula (1), $n_A$ represents a refractive index of a resin component of a matrix, $n_B$ represents a refractive index of an ultrafine particle component of the matrix, and $n_P$ represents a refractive index of a light diffusing fine particle. Further, the resin component may also satisfy the following expression (2).

$$|n_P - n_A| < |n_A - n_B| \quad (2)$$

The refractive index of the resin component is preferably 1.40 to 1.60.

The blending amount of the resin component is preferably 10 parts by weight to 80 parts by weight, more preferably 20 parts by weight to 65 parts by weight.

A-2-2. Ultrafine Particle Component

As described above, the ultrafine particle component 12 is formed of preferably a compound of a different type from those of the resin component described above and the light diffusing fine particles described later, more preferably an inorganic compound. Preferred examples of the inorganic compound include a metal oxide and a metal fluoride. Specific examples of the metal oxide include zirconium oxide (zirconia) (refractive index: 2.19), aluminum oxide (refractive index: 1.56 to 2.62), titanium oxide (refractive index: 2.49 to 2.74), and silicon oxide (refractive index: 1.25 to 1.46). Specific example of the metal fluoride include magnesium fluoride (refractive index: 1.37) and calcium fluoride (refractive index: 1.40 to 1.43). These metal oxides and metal fluorides absorb less light and each have a refractive index which is difficult to be expressed with organic compounds such as the ionizing radiation-curable resin and the thermoplastic resin. Therefore, the weight concentration of the ultrafine particle component becomes relatively higher with increasing distance from the interface with each of the light diffusing fine particles, and thus, the metal oxides and metal fluorides can change the refractive index largely. By setting a refractive index difference between each of the light diffusing fine particles and the matrix to be large, a high haze can be realized even with a thin film, and the effect of preventing backscattering is large because the refractive index modulation region is formed. Zirconium oxide is a particularly preferred inorganic compound.

The ultrafine particle component may also satisfy the expressions (1) and (2). The refractive index of the ultrafine particle component is preferably 1.40 or less or 1.60 or more, more preferably 1.40 or less or 1.70 to 2.80, particularly preferably 1.40 or less or 2.00 to 2.80. When the refractive index is more than 1.40 or less than 1.60, the refractive index difference between each of the light diffusing fine particles and the matrix becomes insufficient, and in the case where the light diffusing element is used in a liquid crystal display device adopting a collimated backlight front diffusing system, light from a collimated backlight cannot be diffused enough, which may narrow a viewing angle.

It is preferred that an average primary particle diameter of the ultrafine particle component be small relative to the average thickness L of the refractive index modulation region. More specifically, the average primary particle diameter is preferably 1/50 to 1/2, more preferably 1/25 to 1/3 with respect to the average thickness L. When the average primary particle diameter is more than 1/2 with respect to the average thickness L, the refractive index in the refractive index modulation region does not change substantially continuously in some cases. When the average primary particle diameter is less than 1/50, it may be difficult to form the refractive index modulation region in some cases. The average primary particle diameter is preferably 1 nm to 100 nm, more preferably 1 nm to 50 nm. The ultrafine particle component may form a secondary aggregate, and the average particle diameter (average particle diameter of the aggregate) in that case is preferably 10 nm to 100 nm, more preferably 10 nm to 80 nm. As described above, by using the ultrafine particle component with an average particle diameter smaller than the wavelength of light, geometric reflection, refraction, and scattering are not caused between the ultrafine particle component and the resin component, and a matrix that is optically uniform can be obtained. As a result, a light diffusing element that is optically uniform can be obtained.

It is preferred that the ultrafine particle component have satisfactory dispersibility with the resin component. The term "satisfactory dispersibility" as used herein means that an applied film, which is obtained by applying an application liquid obtained by mixing the resin component, the ultrafine particle component (if required, a small amount of a UV initiator), and a volatile solvent, followed by removing the solvent by drying, is transparent.

Preferably, the ultrafine particle component is subjected to surface modification. By conducting surface modification, the ultrafine particle component can be dispersed satisfactorily in the resin component, and the refractive index modulation region can be formed satisfactorily. As surface modification means, any suitable means can be adopted as long as the effect of the present invention is obtained. Typically, the surface modification is conducted by applying a surface modifier onto the surface of an ultrafine particle component to form a surface modifier layer. Preferred specific examples of the surface modifier include coupling agents such as a silane-based coupling agent and a titanate-based coupling agent, and a surfactant such as a fatty acid-based surfactant. By using such surface modifier, the wettability between the resin component and the ultrafine particle component is enhanced, the interface between the resin component and the ultrafine particle component is stabilized, the ultrafine particle component is dispersed satisfactorily in the resin component, and the refractive index modulation region can be formed satisfactorily.

The blending amount of the ultrafine particle component is preferably 15 parts by weight to 80 parts by weight, more preferably 20 parts by weight to 70 parts by weight with respect to 100 parts by weight of the matrix.

A-3. Light Diffusing Fine Particles

The light diffusing fine particles 20 are also formed of any suitable material, as long as the fine uneven-shaped boundary as described above (and consequently, the refractive index modulation region) is formed satisfactorily. Preferably, as described above, the light diffusing fine particles 20 are formed of a compound of the same type as that of the resin component of the matrix. For example, in the case where the ionizing radiation-curable resin that constructs the resin component of the matrix is an acrylate-based resin, it is preferred that the light diffusing fine particles be also constructed of the acrylate-based resin. More specifically, when the monomer component of the acrylate-based resin that constructs the resin component of the matrix is, for example, PETA, NPGDA, DPHA, DPPA, and/or TMPTA as described above, the acrylate-based resin that constructs the light-diffusing fine particles is preferably polymethyl methacrylate (PMMA), polymethyl acrylate (PMA), or a copolymer thereof, or a cross-linked product thereof. A copolymerizable component for each of PMMA and PMA is, for example, polyurethane, polystyrene (PS), or a melamine resin. Particularly preferably, the light diffusing fine particles are constructed of PMMA. This is because the relationship in refractive index and thermodynatic properties with respect to the resin component of the matrix and the ultrafine particle component is suitable. Further, preferably, the light diffusing fine particles have a cross-linked structure (three-dimensional network structure). By adjusting coarseness and fineness (cross-linking degree) of the cross-linked structure, a degree of freedom of polymer molecules forming the light diffusing fine particles on the surfaces thereof can be controlled, and hence, the dispersion state of the ultrafine particle components can be controlled, with a result that a refractive index modulation region having a desired refractive index gradient can be formed. For example, the swelling degree of each of the light diffusing fine particles at the time of the application of an application liquid described later with respect to the resin component precursor (which may contain a solvent) is preferably 100% to 200%. Here, the term "swelling degree" is an index of the cross-linking degree and refers to a ratio of an average particle diameter of each of the particles in a swollen state with respect to the average particle diameter of each of the particles before being swollen.

The average particle diameter of each of the light diffusing fine particles is preferably 1.0 µm to 5.0 µm, more preferably 1.0 µm to 4.0 µm. The average particle diameter of each of the light diffusing fine particles is preferably ½ or less (for example, ½ to 1/20) of the thickness of the light diffusing element. As long as the light diffusing fine particles each have an average particle diameter having such ratio with respect to the thickness of the light diffusing element, a plurality of light diffusing fine particles can be arranged in a thickness direction of the light diffusing element. Therefore, while incident light is passing through the light diffusing element, the incident light can be diffused in a multiple manner, and consequently, sufficient light diffusibility can be obtained.

The standard deviation of a weight average particle diameter distribution of the light diffusing fine particles is preferably 1.0 µm or less, more preferably 0.5 µm or less. When the light diffusing fine particles each having a small particle diameter with respect to the weight average particle diameter are present in a large number, the light diffusibility may increase too much to suppress backscattering satisfactorily. When the light diffusing fine particles each having a large particle diameter with respect to the weight average particle diameter are present in a large number, a plurality of the light diffusing fine particles cannot be arranged in a thickness direction of the light diffusing element, and multiple diffusion may not be obtained. As a result, the light diffusibility may become insufficient.

As the shape of each of the light diffusing fine particles, any suitable shape can be adopted depending upon the purpose. Specific examples thereof include a spherical shape, a scale like shape, a plate shape, an oval shape, and an amorphous shape. In most cases, spherical fine particles can be used as the light diffusing fine particles.

The light diffusing fine particles may also satisfy the expressions (1) and (2). The refractive index of the light diffusing fine particles is preferably 1.30 to 1.70, more preferably 1.40 to 1.60.

The blending amount of the light diffusing fine particles is preferably 10 parts by weight to 100 parts by weight, more preferably 10 parts by weight to 40 parts by weight, still more preferably 10 parts by weight to 35 parts by weight with respect to 100 parts by weight of the matrix. For example, by allowing the light diffusing fine particles having an average particle diameter in the above-mentioned preferred range to be contained in such blending amount, a light diffusing element which is made of a thin film and has very excellent light diffusibility can be obtained.

A-4. Manufacturing Method for Light Diffusing Element

A manufacturing method for a light diffusing element according to this embodiment includes the steps of: applying an application liquid, in which a resin component or a precursor thereof and an ultrafine particle component of a matrix, and light diffusing fine particles are dissolved or dispersed in a volatile solvent, onto a base material (defined as Step A); and drying the application liquid applied onto the base material (defined as Step B).

(Step A)

The resin component or precursor thereof, the ultrafine particle component, and the light diffusing fine particles are as described in the sections A-2-1, A-2-2, and A-3, respectively. Typically, the application liquid is a dispersion in which the ultrafine particle component and the light diffusing fine particles are dispersed in the precursor and the volatile solvent. As means for dispersing the ultrafine particle component and the light diffusing fine particles, any suitable means (for example, ultrasound treatment or dispersion treatment with a stirrer) can be adopted.

Any suitable solvent can be adopted as the volatile solvent as long as the solvent can dissolve or uniformly disperse each component described above. Specific examples of the volatile solvent include ethyl acetate, butyl acetate, isopropyl acetate, 2-butanone (methyl ethyl ketone), methyl isobutyl ketone, cyclopentanone, toluene, isopropyl alcohol, n-butanol, cyclopentane, and water.

The application liquid can further contain any suitable additive depending upon the purpose. For example, in order to disperse the ultrafine particle component satisfactorily, a dispersant can be preferably used. Other specific examples of the additive include a UV absorbing agent, a leveling agent, and an antifoaming agent.

The blending amount of each component in the application liquid is as described in the above sections A-2 to A-3. The solid content of the application liquid can be adjusted so as to be preferably about 10% by weight to 70% by weight. With such solid content, an application liquid having a viscosity that facilitates application can be obtained.

Any suitable film can adopted as the base material as long as the effects of the present invention can be provided. Specific examples thereof include a triacetyl cellulose (TAC) film, a polyethylene terephthalate (PET) film, a polypropylene (PP) film, a nylon film, an acrylic film, and a lactone-modified acrylic film. The base material may be subjected to surface modification such as adhesion enhancement treatment, or may include an additive such as a lubricant, an antistat, or a UV absorbing agent, as required. The base material may function as a protective layer in a polarizing plate with a light diffusing element described later.

Any suitable method using a coater can be adopted as a method of applying the application liquid onto the base material. Specific examples of the coater include a bar coater, a reverse coater, a kiss coater, a gravure coater, a die coater, and a comma coater.

(Step B)

As the method of drying the application liquid, any suitable method can be adopted. Specific examples thereof include natural drying, drying by heating, and drying under reduced pressure. Drying by heating is preferred. The heating temperature is, for example, 60° C. to 150° C., and the heating time is, for example, 30 seconds to 5 minutes.

(Step C)

The manufacturing method further includes preferably the step of polymerizing the precursor after the application step (Step C). As the polymerization method, any suitable method can be adopted depending upon the kind of the resin component (thus, the precursor thereof). For example, in the case where the resin component is an ionizing radiation-curable resin, the precursor is polymerized by emitting ionizing radiation. In the case of using UV light as the ionizing radiation, the integrated light quantity is preferably 50 mJ/cm$^2$ to 1,000 mJ/cm$^2$. The transmittance of the ionizing radiation with respect to the light diffusing fine particles is preferably 70% or more, more preferably 80% or more. Further, for example, in the case where the resin component is a thermosetting resin, the precursor is polymerized by heating. The heating temperature and the heating time can be set appropriately depending upon the kind of the resin component. Preferably, the polymerization is conducted by emitting ionizing radiation. The ionizing radiation can cure an applied film while keeping the refractive index modulation region satisfactorily, and hence, a light diffusing element with satisfactory diffusion property can be manufactured. By polymerizing the precursor, the matrix 10, in which two regions having different refractive indices at in the vicinity of the interface with each of the light diffusing fine particles form a fine uneven-shaped boundary, thereby to form the refractive index modulation region 30, is formed.

The polymerization step (Step C) may be conducted before the drying step (Step B) or after Step B.

As described above, the light diffusing element as illustrated in FIGS. 1A and 1B is formed on a base material.

It should be appreciated that the manufacturing method for a light diffusing element according to this embodiment can include, in addition to Steps A to C, any suitable steps, treatments and/or operations at any suitable times. The kind of such steps and the like and the time when such steps and the like are conducted can be set appropriately depending upon the purpose.

As described above, the light diffusing element as described in the sections A-1 to A-3 is formed on a base material.

A-5. Another Embodiment

Figure 6:
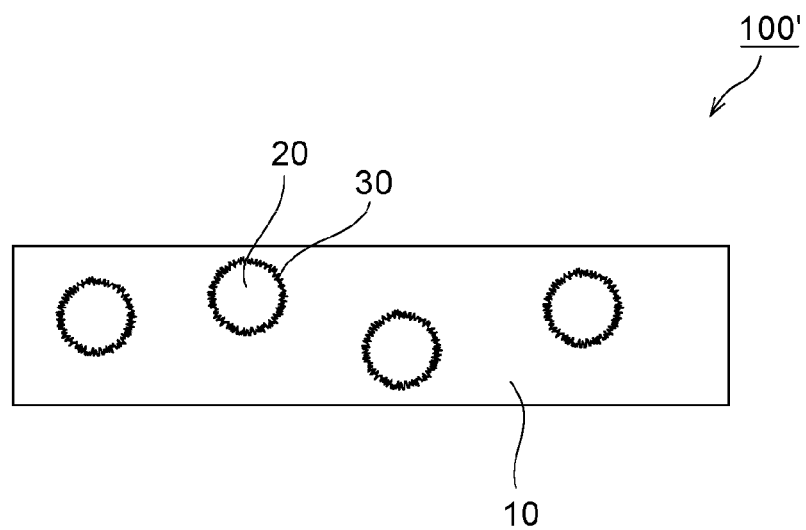
FIG. 6 is a schematic cross-sectional view of a light diffusing element according to another embodiment of the present invention.

FIG. 6 is a schematic cross-sectional view of a light diffusing element according to another embodiment of the present invention. A light diffusing element 100' of FIG. 6 includes a matrix 10 and light diffusing fine particles 20 dispersed in the matrix 10. The light diffusing fine particle 20 is formed so that its periphery is fine uneven-shaped, and the fine uneven-shaped and spherical shell-shaped boundary is formed by the peripheral potion and the boundary constitutes the refractive index modulation region 30. That is, in this embodiment, the fine uneven-shaped and spherical shell-shaped boundary (hence the refractive index modulation region) is formed by the unevenness of the surface of each of the light diffusing fine particles. The unevenness of the surface of each of the light diffusing fine particles may be formed by any suitable means. For example, the fine uneven shape may be formed by treating the surfaces of the light diffusing fine particles with a suitable solvent. Examples of the solvent to be used in the surface treatment include: ketone-based solvents such as methyl ethyl ketone (MEK) and methyl isobutyl ketone (MIBK); and ester-based solvents such as ethyl acetate and butyl acetate. The matrix 10 can be formed of, for example, a resin as described in the section A-2-1 regarding a resin component in an embodiment using an ultrafine particle component. It should be noted that, in this embodiment, the matrix 10 may or may not contain an ultrafine particle component. Further, the fine uneven-shaped and spherical shell-shaped boundary may be formed by the unevenness of the surface of each of the light diffusing fine particles alone, or may be formed by a combination of the unevenness of the surface of each of the light diffusing fine particles with the gradient of the dispersion concentration of the ultrafine particle component. In the refractive index modulation region 30, it is preferred that the refractive index change substantially continuously. It should be noted that, in this embodiment, the light diffusing fine particles correspond to the first region and the matrix corresponds to the second region.

This embodiment has been described briefly only with respect to a characteristic portion of its structure. The entire characteristics of the light diffusing element according to this embodiment are as described above regarding the embodiment using a matrix including a resin component and an ultrafine particle component.

A light diffusing element (not shown) according to still another embodiment of the present invention includes a matrix and light diffusing fine particles dispersed in the matrix. The light diffusing fine particles are refractive index gradient particles (for example, GRIN fine particles) the refractive index of which changes from a center portion to an outside, and each refractive index gradient portion constitutes a refractive index modulation region. Typically, the refractive index gradient particles are polymer particles each formed of a center portion and a surface layer portion covering the center portion. A polymer constituting such polymer particles is specifically, for example, a vinyl-based polymer, a (meth)acrylic polymer, or a styrene-based polymer. By selecting a polymer appropriately, a refractive index gradient can be controlled. The refractive index of each of such polymer particles can be changed in stages or continuously by, for example, using a plurality of monomers with different refractive indices, and changing monomer amounts along with the progression of copolymerization of the monomers. Such polymer particles and a manufacturing method therefor are described in detail, for example, in JP 2006-227279 A, the description of which is incorporated herein by reference.

The light diffusing element of the present invention may be peeled from a base material to be used as a single member or may be used as a light diffusing element with a base material. Alternatively, the light diffusing element may be used as a composite member (for example, a polarizing plate with a light diffusing element) by transferring the light diffusing element from a base material to a polarizing plate or the like, or may be used as a composite member (for example, a polarizing plate with a light diffusing element) by attaching the light diffusing element to a polarizing plate or the like together with a base material. In the case of using the light diffusing element as a composite member (for example, a polarizing plate with a light diffusing element) by attaching the light diffusing element to a polarizing plate or the like together with a base material, the base material can function as a protective layer of the polarizing plate. The light diffusing element of the present invention can be used as, for example, a backlight member of a liquid crystal display device or a diffusing member for illumination equipment (for example, an organic EL, LED), besides a diffusing element on a viewer side of a liquid crystal display device adopting the collimated backlight front diffusing system described above.

The particular embodiments of the present invention have been described hereinbefore. It should be noted that the present invention is not limited to those embodiments, and the present invention includes any other light diffusing element including: a first region having a first refractive index; and a second region having a second refractive index, in which the first region and the second region form a fine uneven-shaped and spherical shell-shaped boundary.

B. Polarizing Plate with Light Diffusing Element

B-1. Entire Construction of Polarizing Plate with Light Diffusing Element

Figure 7:
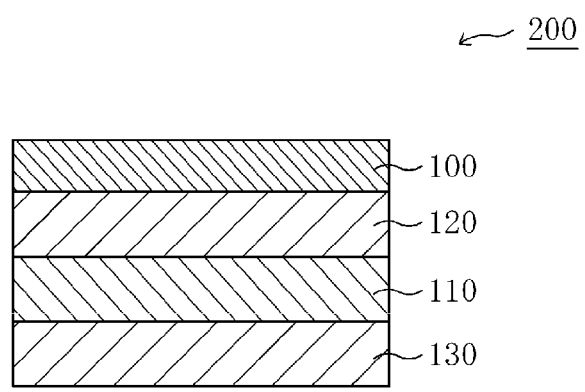
FIG. 7 is a schematic cross-sectional view of a polarizing plate with a light diffusing element according to a preferred embodiment of the present invention.

Typically, a polarizing plate with a light diffusing element of the present invention is placed on a viewer side of a liquid crystal display device. FIG. 7 is a schematic cross-sectional view of a polarizing plate with a light diffusing element according to a preferred embodiment of the present invention. A polarizing plate with a light diffusing element 200 in the figure includes a light diffusing element 100 and a polarizer 110. The light diffusing element 100 is the light diffusing element of the present invention described in the sections A-1 to A-5. The light diffusing element 100 is disposed so as to be placed at a position closest to a viewer side when the polarizing plate with a light diffusing element is placed on the viewer side of the liquid crystal display device. In one embodiment, a low reflective layer or a reflection preventing treatment layer (anti-reflection treatment layer) is placed on the viewer side of the light diffusing element 100 (not shown). In the example illustrated in the figure, the polarizing plate with a light diffusing element 200 includes protective layers 120 and 130 on both sides of the polarizer. The light diffusing element, the polarizer and the protective layers are attached to each other via any suitable adhesive layer or pressure-sensitive adhesive layer. At least one of the protective layers 120 and 130 may be omitted depending upon the purpose, the construction of the polarizing plate, and the construction of the liquid crystal display device. For example, in the case where a base material used for forming the light diffusing element can function as a protective layer, the protective layer 120 may be omitted. The polarizing plate with a light diffusing element of the present invention can be used particularly suitably as a viewer side polarizing plate in a liquid crystal display device adopting a collimated backlight front diffusing system.

B-2. Polarizer

Any appropriate polarizer can be adopted as the polarizer depending on purposes. Examples thereof include: a film prepared by adsorbing a dichromatic substance such as iodine or a dichromatic dye on a hydrophilic polymer film such as a polyvinyl alcohol-based film, a partially formalized polyvinyl alcohol-based film, or a partially saponified ethylene/vinyl acetate copolymer-based film and uniaxially stretching the film; and a polyene-based aligned film such as a dehydrated polyvinyl alcohol film or a dehydrochlorinated polyvinyl chloride film. Of those, a polarizer prepared by adsorbing a dichromatic substance such as iodine on a polyvinyl alcohol-based film and uniaxially stretching the film is particularly preferred because of high polarized dichromaticity. The thickness of the polarizer is not particularly limited, but is generally about 1 to 80 μm.

The polarizer prepared by adsorbing iodine on a polyvinyl alcohol-based film and uniaxially stretching the film may be produced by, for example: immersing a polyvinyl alcohol-based film in an aqueous solution of iodine for coloring; and stretching the film to a 3 to 7 times length of the original length. The aqueous solution may contain boric acid, zinc sulfate, zinc chloride, or the like if necessary, or the polyvinyl alcohol-based film may be immersed in an aqueous solution of potassium iodide or the like. Further, the polyvinyl alcohol-based film may be immersed and washed in water before coloring if necessary.

Washing the polyvinyl alcohol-based film with water not only allows removal of contamination on the surface of the polyvinyl alcohol-based film or washing away of an anti-blocking agent, but also provides an effect of preventing unevenness such as uneven coloring by swelling the polyvinyl alcohol-based film. The stretching of the film may be performed after coloring of the film with iodine, performed during coloring of the film, or performed followed by coloring of the film with iodine. The stretching may be performed in an aqueous solution of boric acid, potassium iodide, or the like, or in a water bath.

B-3. Protective Layer

The protective layers 120 and 130 are each formed of any appropriate film which can be used as a protective layer for a polarizing plate. As a material used as a main component of the film, there are specifically exemplified a cellulose-based resin such as triacetylcellulose (TAC), and transparent resins such as a polyester-based resin, a polyvinyl alcohol-based resin, a polycarbonate-based resin, a polyamide-based resin, a polyimide-based resin, a polyether sulfone-based resin, a polysulfone-based resin, a polystyrene-based resin, a polynorbornene-based resin, a polyolefin-based resin, a (meth)acrylic resin, and an acetate-based resin. Further, there are exemplified a (meth)acrylic, urethane-based, (meth)acrylic urethane-based, epoxy-based, or silicone-based thermosetting resin or UV-curable resin. Still further, there are exemplified a glassy polymer such as a siloxane-based polymer. In addition, a polymer film described in JP 2001-343529 A (WO 01/37007) may also be used. As the film material, for example, there may be used a resin composition containing a thermoplastic resin having a substituted or unsubstituted imide group on a side chain, and a thermoplastic resin having a substituted or unsubstituted phenyl group and a nitrile group on a side chain. An example thereof is a resin composition containing an alternate copolymer of isobutene and N-methylmaleimide, and an acrylonitrile/styrene copolymer. The polymer film may be an extruded product of the resin composition, for example.

The protective layer (internal protective layer) 130 preferably has optical isotropy. Specifically, a thickness direction retardation Rth(550) of the internal protective layer is preferably in a range of −20 nm to +20 nm, more preferably in a range of −10 nm to +10 nm, particularly preferably in a range of −6 nm to +6 nm, most preferably in a range of −3 nm to +3 nm. An in-plane retardation Re(550) of the internal protective layer is preferably 0 nm or more and 10 nm or less, more preferably 0 nm or more and 6 nm or less, particularly preferably 0 nm or more and 3 nm or less. The film for forming the protective layer having the optical isotropy is described in detail in JP 2008-180961 A and the description is incorporated herein by reference.

B-4. Manufacturing Method for Polarizing Plate with Light Diffusing Element

Figure 8:
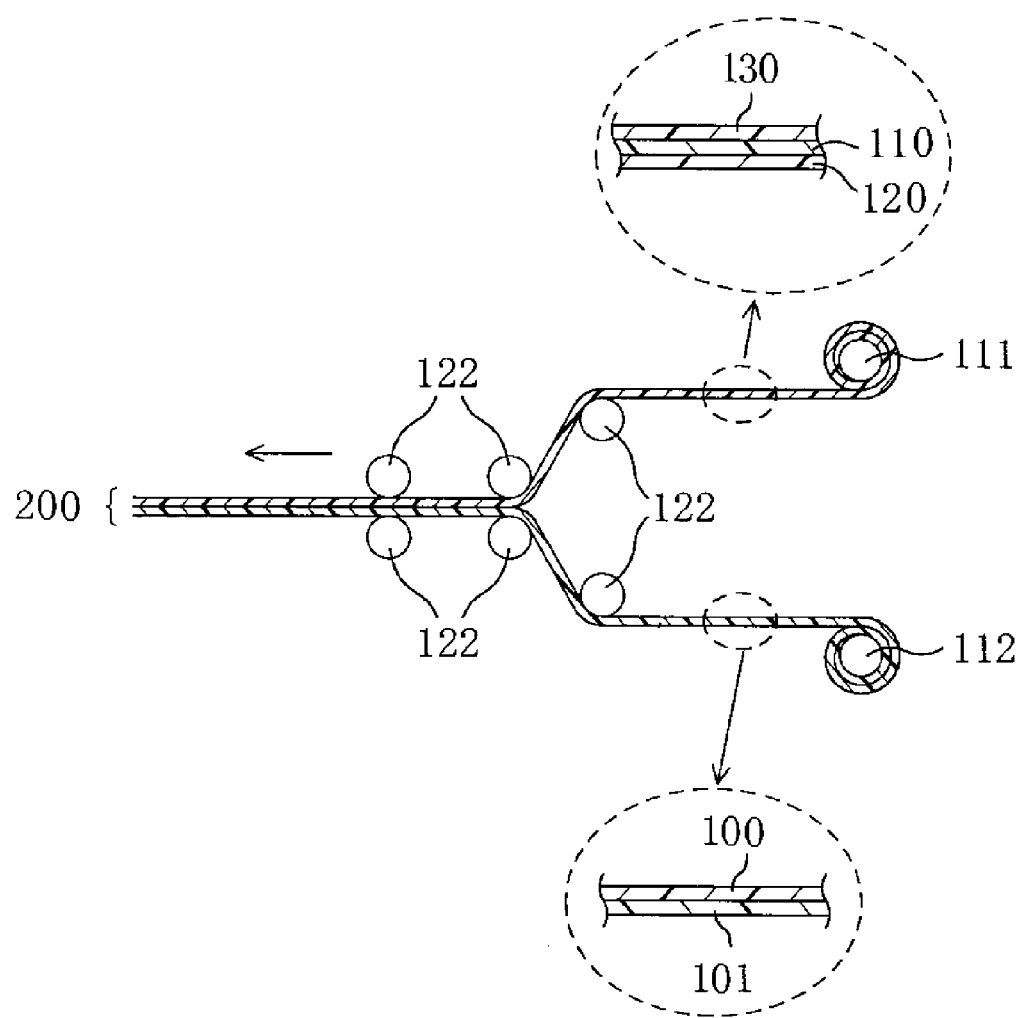
FIG. 8 is a schematic view illustrating an example of a manufacturing method for a polarizing plate with a light diffusing element of the present invention.

Referring to FIG. 8, an example of a manufacturing method for a polarizing plate with a light diffusing element of the present invention is described briefly. In FIG. 8, reference symbols 111 and 112 respectively denote rolls for winding a polarizing plate and a laminate of a light diffusing element/a base material, and 122 denotes conveyance rolls. In the illustrated example, a polarizing plate (protective layer 130/polarizer 110/protective layer 120) and a laminate of a light diffusing element 100/a base material 101 are fed out in an arrow direction and attached to each other while their respective longitudinal directions are aligned. At this time, the polarizing plate and the laminate are attached to each other so that the light diffusing element 100 and the protective layer 120 of the polarizing plate are adjacent to each other. After that, the base material 101 is peeled off if necessary, and thereby, a polarizing plate with a light diffusing element 200 as illustrated in FIG. 7 can be obtained. Although not shown, for example, the polarizing plate (protective layer 130/polarizer 110) and the laminate of the light diffusing element 100/base material 101 can be attached to each other so that the base material 101 and the polarizer 110 are adjacent to each other to produce a polarizing plate with a light diffusing element in which the base material functions as a protective layer. Thus, according to an embodiment of the present invention, so-called roll-to-roll can be adopted, and hence, a polarizing plate with a light diffusing element can be produced at very high production efficiency. Further, the roll-to-roll process can be performed continuously from the production process of the light diffusing element described in the section A-4, and hence, the production efficiency of the polarizing plate with a light diffusing element can be further enhanced by adopting such procedure.

C. Liquid Crystal Display Device

Figure 9:
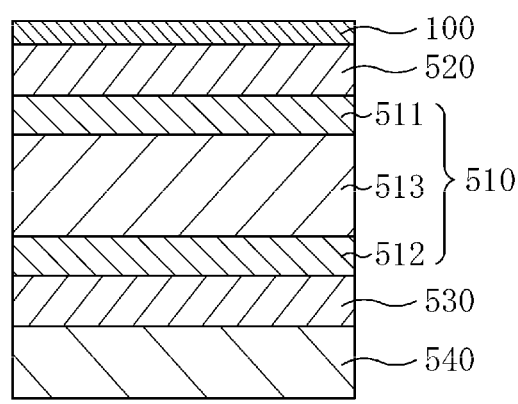
FIG. 9 is a schematic cross-sectional view of a liquid crystal display device according to a preferred embodiment of the present invention.

FIG. 9 is a schematic cross-sectional view of a liquid crystal display device according to a preferred embodiment of the present invention. A liquid crystal display device 500 includes a liquid crystal cell 510, polarizing plates 520 and 530 placed on both sides of the liquid crystal cell, a backlight unit 540 provided on an outer side of the polarizing plate 530, and the light diffusing element 100 provided on an outer side (viewer side) of the polarizing plate 520. Any suitable optical compensation plate (retardation plate) can be placed between the liquid crystal cell 510 and the polarizing plates 520 and/or 530 depending upon the purpose. The liquid crystal cell 510 includes a pair of substrates (typically, glass substrates) 511 and 512, and a liquid crystal layer 513 containing a liquid crystal as a display medium, placed between the substrates 511 and 512.

The light diffusing element 100 is the light diffusing element of the present invention described in the sections A-1 to A-5. Alternatively, the polarizing plate with a light diffusing element of the present invention described in the section B may be placed instead of the light diffusing element 100 and the viewer side polarizing plate 520. The light diffusing element transmits and diffuses light (typically, collimated light as described later) having passed through the liquid crystal cell.

The backlight unit 540 is a collimated light source device for emitting collimated light to the liquid crystal cell 510. The backlight unit may have any suitable construction capable of emitting the collimated light. For example, the backlight unit includes a light source and a condensing element for collimating light emitted from the light source (both not shown). In this case, any suitable condensing element capable of collimating light emitted from the light source can be adopted as the condensing element. When the light source itself may emit the collimated light, the condensing element may be omitted. The followings are exemplified as a specific construction of the backlight unit (collimated light source device): (1) a construction in which a condensing element having a light shielding layer or a reflective layer provided in a portion except a lens focus, on a flat surface side of a lenticular lens or cannonball type lens is located on a liquid crystal cell side of a light source (for example, cold cathode fluorescent lamp) (for example, JP 2008-262012 A); (2) a construction including a side light type LED light source, a light guide plate therefor, and a variable angle prism which has a convex surface formed on a light guide plate side thereof and is provided on a liquid crystal cell side of the light guide plate (in this construction, anisotropic diffusing element may be further used if necessary; for example, JP 3442247 B2); (3) a construction in which a louver layer having a light absorbing resin and a transparent resin alternately formed in a stripe shape is provided between a backlight and a backlight-side polarizing plate (for example, JP 2007-279424 A); (4) a construction using a cannonball type LED as a light source (for example, JP 06-130255 A); and (5) a construction using a Fresnel lens and, if necessary, a diffusion plate (for example, JP 01-126627 A). The above-mentioned documents describing the detailed constructions are incorporated herein by reference. The construction (5) is described below as an example.

Figure 10A:
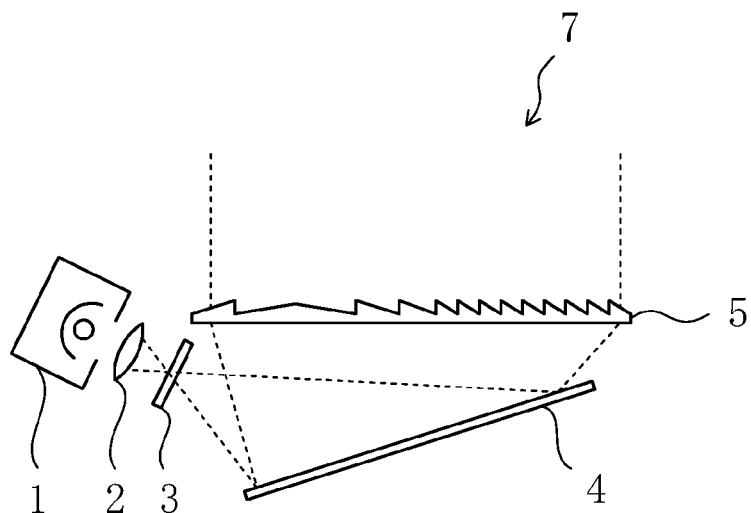
FIG. 10A is a schematic view of a collimated light source device used in the present invention.

FIG. 10A is a schematic view of the collimated light source device of the construction (5). A collimated light source device 7 includes a light source 1, a projection lens 2, a lenticular lens 3, a reflective plate 4, and a Fresnel lens 5. A light beam emitted from the light source 1 passes through the projection lens 2 and the lenticular lens 3, and is reflected from a mirror surface of the reflective plate 4. The reflected light beam passes through the Fresnel lens 5 and is radiated as collimated light.

Figure 10B:
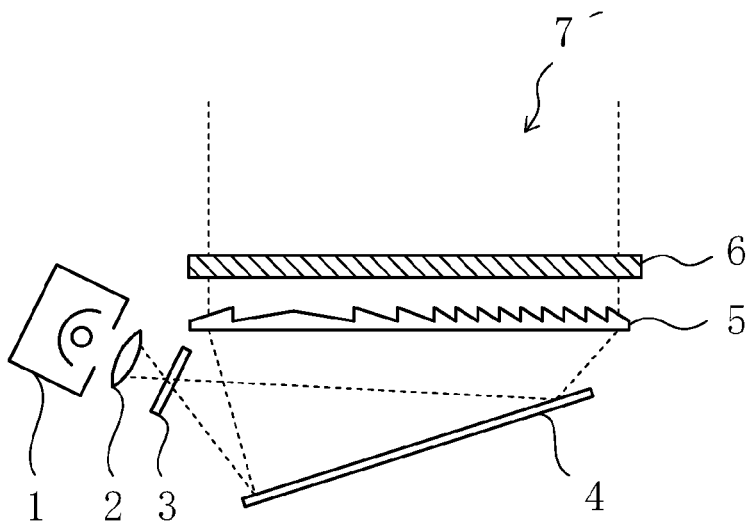
FIG. 10B is a schematic view of another embodiment of the collimated light source device used in the present invention.

In the collimated light source device in the mode of the construction (5), it is preferred that a diffusion plate for imparting desired diffusibility be placed on a light source side or a liquid crystal cell side of a Fresnel lens of a projection type backlight unit. FIG. 10B illustrates a mode in which a diffusion plate 6 is placed on a liquid crystal cell side of the Fresnel lens 5. The light beam emitted from the light source 1 passes through the projection lens 2 and the lenticular lens 3 and is reflected from a mirror surface of the reflective plate 4. The reflected light beam passes through the Fresnel lens 5 and is radiated as collimated light. The radiated collimated light further passes through the diffusion plate 6 and is diffused and radiated.

Regarding the diffusibility of the diffusion plate, a haze is preferably 2% to 92%, more preferably 30% to 80%. Further, regarding the diffusibility of the diffusion plate, a light diffusion half-value angle is preferably 1° to 30°, more preferably 5° to 20°. It should be noted that the diffusion plate may include a straight-transmitted component, and in this case, it is preferred that the light diffusion half-value angle regarding diffused light excluding the straight-transmitted component be 1° to 30°.

As a diffusion plate having such property, any suitable diffusion plate can be used. Specifically, examples thereof include: a surface uneven diffusion film or internal diffusion film in which a binder containing fine particles is applied onto a transparent substrate film; a phase-separation extruded sheet obtained by blending incompatible resins, followed by extrusion molding; an embossed sheet in which an uneven pattern is formed on the surface with emboss rolls; and an integrated structure of a lens and a diffusion plate, in which one surface or both surfaces of a Fresnel lens are provided with a fine uneven shape by, for example, applying a binder containing fine particles to the surface(s).

Figure 11:
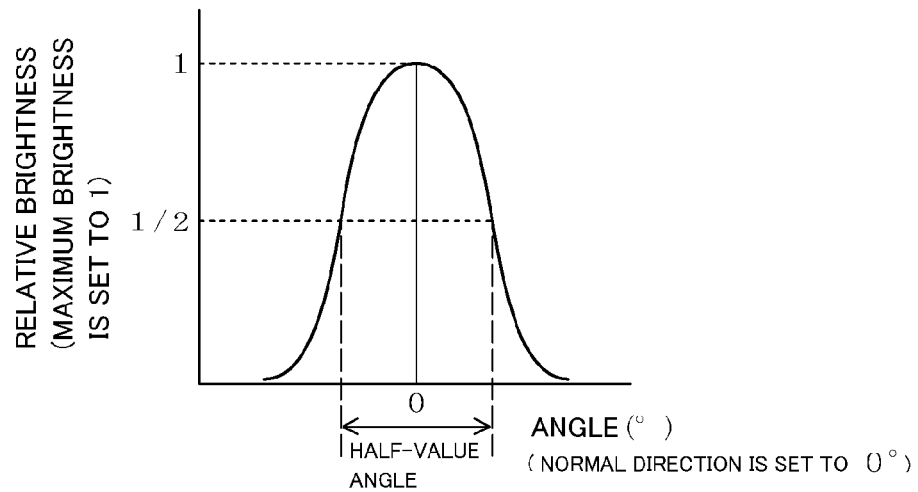
FIG. 11 is a schematic diagram for illustrating a method of calculating a half-value angle in the present invention.

Regarding the diffusion performance of the backlight unit 540, a half-value angle is preferably 1° to 40°, more preferably 2° to 30°, still more preferably 2.5° to 20°. When the half-value angle is less than 1°, there is a possibility that glare (glaring) cannot be reduced even when the diffusion performance of the light diffusing element is enhanced. When the half-value angle is more than 40°, oblique light which is not completely compensated in black display is generated, and the oblique light is diffused also to the front surface by the light diffusing element. Therefore, there is a possibility that brightness in black display increases, and a front contrast ratio may be degraded. It should be noted that, in the present invention, the half-value angle refers to a full width at half maximum of an angle at which brightness becomes ½ when an angle is changed from a direction in which brightness becomes maximum, as illustrated in FIG. 11. It should be noted that, even when the half-value angle is less than 1°, if the bottom of diffusion is spread, the same effect as that obtained when the half-value angle is 1° or more may be obtained in some cases. For example, when an average diffusion angle θd expressed by the following expression is 1° or more, glare (glaring) can be reduced by a combination with a light diffusing element performing multiple diffusion.

$$\theta_d = 2 \times \frac{\int_{\phi=0}^{2\pi} \int_{\theta=0}^{\pi/2} \theta \cdot \{L(\phi, \theta)\cos\theta\}\sin\theta d\theta d\phi}{\int_{\phi=0}^{2\pi} \int_{\phi=0}^{\pi/2} \{L(\phi, \theta)\cos\theta\}\sin\theta d\theta d\phi}$$ [Math. 1]

$L(\phi,0)$: Backlight brightness

The liquid crystal layer 513 preferably includes liquid crystal molecules that are vertically aligned during black display. Examples of a driving mode of the liquid crystal cell including such liquid crystal layer include a multi-domain vertical alignment (MVA) mode, a pattern VA (PVA) mode, a twisted nematic (TN) mode, an electrically controlled birefringence (ECB) mode, and an optically compensated bend (OCB) mode.

EXAMPLES

Hereinafter, the present invention is specifically described by way of examples. However, the present invention is not limited by these examples. Evaluation methods in the examples are as follows. In addition, unless otherwise stated, "part(s)" and "%" in the examples are by weight.

(1) Thickness of Light Diffusing Element

The total thickness of a base material and a light diffusing element was measured with a microgauge-type thickness meter (manufactured by Mitutoyo Corporation), and the thickness of the base material was subtracted from the total thickness to calculate the thickness of the light diffusing element.

(2) Confirmation of Fine Uneven-Shaped Boundary, and Calculation of Average Pitch of Unevenness and Average Height of Unevenness Two-dimensional and three-dimensional images were observed with a transmission electron microscope (TEM) (manufactured by Hitachi, Ltd., trade name "H-7650," acceleration voltage: 100 kV). For the two-dimensional image, a laminate of a light diffusing element and a base material obtained in each of Examples and Comparative Examples was sliced into a piece having a thickness of 0.1 μm with a microtome while being cooled with liquid nitrogen, and the piece was used as a measurement sample. The state of a light diffusing fine particle of the light diffusing element portion of the measurement sample, and the state of an interface between the light diffusing fine particle and a matrix were observed. For the three-dimensional image, gold particles each having a diameter of 5 nm were caused to adhere as markers for photographing position adjustment to the measurement sample obtained in the foregoing, and continuous inclined TEM images (121 images) were photographed over the range of −60° to 60° in an increment of 1°. The 121 TEM images were subjected to position adjustment by a fiducial marker method to reconstruct the three-dimensional image. IMOD 3.9.3 1 was used as reconstruct software and Amira (Mercury Computer Systems) was used as display software. An interface (actual interface) between the light diffusing fine particle and the matrix was sampled from the three-dimensional reconstructed image obtained as described above, the actual interface was subjected to fitting with an approximate curve, and the average pitch of the unevenness of the fine uneven-shaped boundary and the average height of the unevenness were determined from distances between protruded portions each protruding from the approximate curve by 30 nm or more at the actual interface and the average height of the protruded portions. It should be noted that the following equation was used for the approximate curve for the fitting.

$z=ax^2+by^2+cxy+dx+ey+f$ (3) Haze

Measurement was performed with a haze meter ("HN-150" (trade name) manufactured by Murakami Color Research Laboratory Co., Ltd.) in accordance with a method specified in JIS 7136.

(4) Light Diffusion Half-Value Angle

Figure 12:
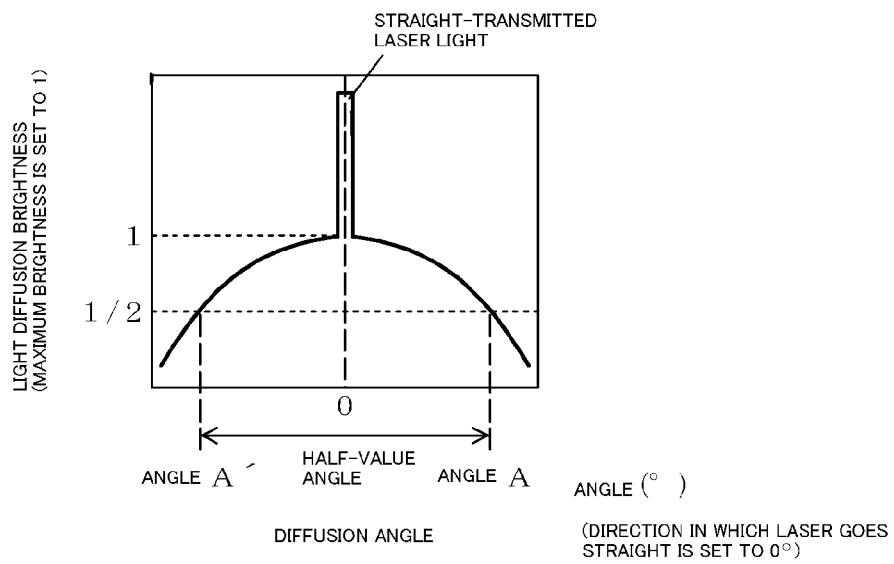
FIG. 12 is a schematic view for illustrating a method of calculating a light diffusion half-value angle.

The light diffusing element was irradiated with laser light from its front surface. The diffusion brightness of diffused light at a diffusion angle was measured every 1° by a goniophotometer. As shown in FIG. 12, diffusion angles corresponding to a half of a maximum value of diffusion brightness of light beams other than a straight-transmitted laser beam were measured on both sides of a diffusion profile. A value obtained by adding the angles measured on both sides ("(angle A)+(angle A')" in FIG. 12) was defined as a light diffusion half-value angle.

(5) Backscattering ratio

The laminate of the light diffusing element and the base material obtained in each of the examples and comparative examples was attached onto a black acrylic plate ("SUMIPEX" (trade name) (trademark), thickness: 2 mm, manufactured by Sumitomo Chemical Co., Ltd.) via a transparent pressure-sensitive adhesive to obtain a measurement sample. The integrated reflectance of the measurement sample was measured with a spectrophotometer ("U4100" (trade name) manufactured by Hitachi Ltd.). On the other hand, a laminate of a base material and a transparent applied layer was produced as a control sample, using an application liquid in which fine particles were removed from an application liquid for the light diffusing element and the integrated reflectance (i.e., surface reflectance) thereof was measured in the same way as described above. The integrated reflectance (surface reflectance) of the control sample was subtracted from the integrated reflectance of the measurement sample to calculate a backscattering ratio of the light diffusing element.

Example 1

Production of Light Diffusing Element

To 100 parts of a hard coat resin ("Opstar KZ6661" (trade name) (containing MEK/MIBK) manufactured by JSR Corporation) containing 62% of zirconia nano particles (average primary particle diameter: 10 nm, average particle diameter: 60 nm, refractive index: 2.19) as an ultrafine particle component, 11 parts of a 50% methyl ethyl ketone (MEK) solution of pentaerythritol triacrylate ("Biscoat#300" (trade name), refractive index: 1.52, manufactured by Osaka Organic Chemical Industry Ltd.) as a precursor of a resin component, 0.5 part of a photopolymerization initiator ("Irgacure 907" (trade name), manufactured by BASF Japan Ltd.), 0.5 part of a leveling agent ("GRANDIC PC 4100" (trade name), manufactured by DIC Corporation), and 15 parts of polymethyl methacrylate (PMMA) fine particles ("SAX-102" (trade name), average particle diameter: 2.5 μm, refractive index: 1.495, manufactured by Sekisui Plastics Co., Ltd.) as light diffusing fine particles were added. The mixture was subjected to dispersion treatment by stirring with a stirring machine ("DESPA" (trade name), manufactured by ASADA IRON WORKS. CO., LTD.) for 30 minutes to prepare an application liquid in which the above-mentioned respective components were dispersed uniformly. The solid content of the application liquid was 55%. Immediately after the application liquid was prepared, the application liquid was applied onto a base material made of a TAC film ("FUJITAC" (trade name), thickness: 40 μm, manufactured by Fuji Photo Film Co., Ltd.) with a bar coater, dried at 100° C. for 1 minute, and irradiated with UV light with an integrated light quantity of 300 mJ/cm² to obtain a light diffusing element with a thickness of 11 μm.

Figure 13:
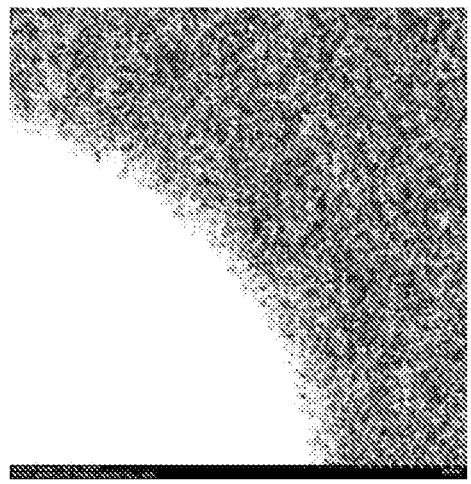
FIG. 13 is a TEM image of the vicinity of a light diffusing fine particle of a light diffusing element of Example 1.

A difference between an average refractive index $n_M$ of the matrix and a refractive index $n_P$ of the light diffusing fine particle in the light diffusing element thus obtained was 0.12 ($n_M > n_P$). The obtained light diffusing element was subjected to the above-mentioned evaluations (1) to (5). Table 1 shows the results together with the results of Examples 2 to 10 and Comparative Examples 1 to 3 described later. In addition, the obtained light diffusing element was subjected to TEM observation. FIG. 13 shows the results. A three-dimensional image was reconfigured from the TEM image, and the three-dimensional reconfigured image was binarized. As a result, it was confirmed that a fine uneven-shaped boundary as shown in each of FIG. 2B to FIG. 2E was formed. In addition, a relationship between a distance from the surface of the light diffusing fine particle and the dispersion concentration (presence ratio) of the ultrafine particle component was calculated from the TEM image. As a result, it was confirmed that, as shown in FIG. 3, the gradient of the dispersion concentration of the ultrafine particle component was formed.

TABLE 1

|  |  | Fine uneven-shaped boundary | | | | Half-value | | |
|---|---|---|---|---|---|---|---|---|
|  |  | Average pitch (nm) | Average height (nm) | Δn | Thickness (μm) | angle (°) | Haze (%) | Backscattering ratio (%) |
| Example 1 | Present | 15 | 40 | 0.12 | 11 | 55 | 97.60 | 0.39 |
| Example 2 | Present | 19 | 52 | 0.12 | 10 | 60 | 97.91 | 0.38 |
| Example 3 | Present | 40 | 120 | 0.12 | 10 | 62 | 98.02 | 0.48 |
| Example 4 | Present | 30 | 50 | 0.12 | 11 |  | 99.45 |  |
| Example 5 | Present | 80 | 40 | 0.12 | 11 | 65 | 98.76 |  |
| Example 6 | Present | 60 | 80 | 0.12 | 10 | 60 | 98.76 |  |
| Example 7 | Present | 50 | 15 | 0.12 | 10 | 59 | 98.82 | 0.29 |
| Example 8 | Present | 16 | 24 | 0.12 | 10 | 41 | 97.01 | 0.21 |
| Example 9 | Present | 80 | 25 | 0.08 | 9 | 32 | 95.93 | 0.05 |
| Example 10 | Present | 60 | 200 | 0.11 | 10 | 20 | 93.26 | 0.01 |
| Comparative Example 1 | Absent | — | — | 0.12 | 13 | 58 | 97.91 | 0.69 |
| Comparative Example 2 | Absent | — | — | 0.12 | 10 | 5 | 20 | 0.004 |
| Comparative Example 3 | Absent | — | — | 0.15 | 10 | 30 | 88.99 | 0.15 |

Example 2

Production of Light Diffusing Element

A light diffusing element having a thickness of 10 μm was obtained in the same way as in Example 1 except for using, as light diffusing fine particles, polymethyl methacrylate (PMMA) fine particles ("XX-1341AA" (trade name), average particle diameter: 2.5 μm, refractive index: 1.495, manufactured by Sekisui Plastics Co., Ltd.). The obtained light diffusing element was subjected to the same evaluations as those of Example 1. Table 1 above shows the results. In the formed fine uneven-shaped boundary, the maximum distance between protruded portions was 32 nm and the average pitch was 19 nm. Further, the maximum height of the unevenness was 78 nm and the average height of the unevenness was 52 nm.

Example 3

Production of Light Diffusing Element

A light diffusing element having a thickness of 10 μm was obtained in the same way as in Example 1 except for using, as light diffusing fine particles, polymethyl methacrylate (PMMA) fine particles ("Art Pearl J4P" (trade name), average particle diameter: 2.5 µm, refractive index: 1.495, manufactured by Negami Chemical Industrial Co., Ltd.). The obtained light diffusing element was subjected to the same evaluations as those of Example 1. Table 1 above shows the results.

Example 4

Production of Light Diffusing Element

A light diffusing element having a thickness of 11 µm was obtained in the same way as in Example 3 except for using 100 parts of a hard coat resin (containing MEK/PGME, manufactured by JSR Corporation) containing 60% of titania nanoparticles (average primary particle diameter: 10 nm, average particle diameter: 60 nm, refractive index: 2.3) as an ultrafine particle component. The obtained light diffusing element was subjected to the same evaluations as those of Example 1. Table 1 above shows the results.

Example 5

Production of Light Diffusing Element

A light diffusing element having a thickness of 11 µm was obtained in the same way as in Example 3 except for using 11 parts of a 50% MEK solution of hydroxyethyl acrylamide ("HEAA" (trade name), refractive index: 1.52, manufactured by Kohjin Holdings Co., Ltd.) as a precursor of a resin component. The obtained light diffusing element was subjected to the same evaluations as those of Example 1. Table 1 above shows the results.

Example 6

Production of Light Diffusing Element

A light diffusing element having a thickness of 10 µm was obtained in the same way as in Example 3 except for using 11 parts of a 50% MEK solution of acryloylmorpholine ("ACMO" (trade name), refractive index: 1.52, manufactured by Kohjin Holdings Co., Ltd.) as a precursor of a resin component. The obtained light diffusing element was subjected to the same evaluations as those of Example 1. Table 1 above shows the results.

Example 7

Production of Light Diffusing Element

A light diffusing element having a thickness of 10 µm was obtained in the same way as in Example 1 except for using 15 parts of fine particles of polymethyl methacrylate (PMMA) provided with a hydrophilic group ("XX-157-AA" (trade name), average particle diameter: 2.5 µm, refractive index: 1.495, manufactured by Sekisui Plastics Co., Ltd.) as light diffusing fine particles. The obtained light diffusing element was subjected to the same evaluations as those of Example 1. Table 1 above shows the results.

Example 8

Production of Light Diffusing Element

A light diffusing element having a thickness of 10 µm was obtained in the same way as in Example 1 except for using 15 parts of copolymer fine particles of polymethyl methacrylate (PMMA) and polystyrene (PS) ("XX-164-AA" (trade name), average particle diameter: 2.5 µm, refractive index: 1.495, manufactured by Sekisui Plastics Co., Ltd.) as light diffusing fine particles. The obtained light diffusing element was subjected to the same evaluations as those of Example 1. Table 1 above shows the results.

Example 9

Production of Light Diffusing Element

A light diffusing element having a thickness of 9 µm was obtained in the same way as in Example 1 except that the content of zirconia nanoparticles as an ultrafine particle component in a hard coat resin was set to 25%. The obtained light diffusing element was subjected to the same evaluations as those of Example 1. Table 1 above shows the results.

Example 10

Production of Light Diffusing Element

Figure 14:
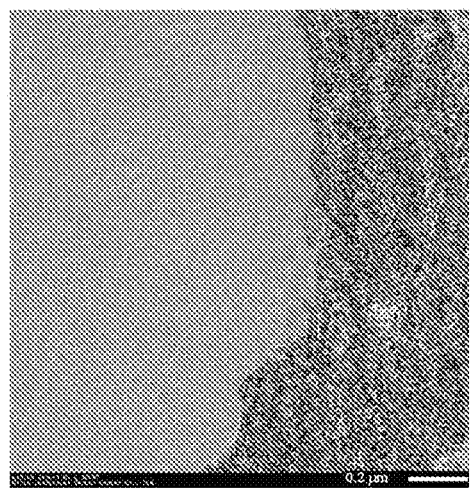
FIG. 14 is a TEM image of the vicinity of a light diffusing fine particle of a light diffusing element of Example 10.

A light diffusing element having a thickness of 10 µm was obtained in the same way as in Example 1 except for: adding 15 parts of polystyrene (PS) fine particles ("SX-350H" (trade name), average particle diameter: 3.5 µm, refractive index: 1.595, manufactured by Soken Chemical & Engineering Co., Ltd.) as light diffusing fine particles to 100 parts of a hard coat resin ("Z7540" (trade name), manufactured by JSR Corporation) containing 30% of silica nanoparticles (average primary particle diameter: 10 nm, average particle diameter: 40 nm, refractive index: 1.49) as an ultrafine particle component; and forming the surfaces of the PS fine particles into a fine uneven shape by treatment with MEK (forming the PS fine particles into a confetti-like shape). The obtained light diffusing element was subjected to the same evaluations as those of Example 1. Table 1 above shows the results. The obtained light diffusing element was subjected to the same evaluations as in Example 1. Table 1 above shows the results. In addition, FIG. 14 shows a TEM image of the vicinity of a light diffusing fine particle of the obtained light diffusing element. The TEM image confirmed that a fine uneven-shaped boundary was formed.

Comparative Example 1

A light diffusing element having a thickness of 13 µm was obtained in the same way as in Example 1 except for using silicone resin fine particles ("Tospearl 120" (trade name), average particle diameter: 2.0 µm, refractive index: 1.43, manufactured by Momentive Performance Materials Inc.) as light diffusing fine particles instead of the PMMA fine particles. The obtained light diffusing element was subjected to the same evaluations as in Example 1. Table 1 above shows the results.

Comparative Example 2

Figure 15:
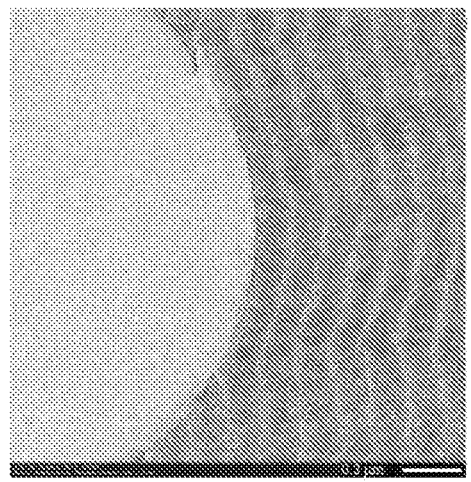
FIG. 15 is a TEM image of the vicinity of a light diffusing fine particle of a light diffusing element of Comparative Example 2.

A light diffusing element having a thickness of 10 µm was obtained in the same way as in Example 1 except for using a hard coat resin not containing zirconia nanoparticles as an ultrafine particle component. The obtained light diffusing element was subjected to the same evaluations as those of Example 1. Table 1 above shows the results. In addition, FIG. 15 shows a TEM image of the vicinity of a light diffusing fine particle of the obtained light diffusing element.

The TEM image reveals that an interface between a light diffusing fine particle and a matrix is clear, and no fine uneven-shaped boundary is formed.

Comparative Example 3

A light diffusing element having a thickness of 10 μm was obtained in the same way as in Example 1 except for using 15 parts of methyl-modified silica fine particles ("Seahoster KE-250" (trade name), manufactured by Nippon Shokubai Co., Ltd.) as light diffusing fine particles. The obtained light diffusing element was subjected to the same evaluations as those of Example 1. Table 1 above shows the results.

Example 11

Production of Liquid Crystal Display Device

A liquid crystal cell was removed from a commercially available liquid crystal TV ("KDL20J3000" (trade name), BRAVIA (20-inch), manufactured by Sony Corporation) having a liquid crystal cell of a multi-domain type VA mode. Commercially available polarizing plates ("NPF-SEG1423DU" (trade name), manufactured by Nitto Denko Corporation) were attached to both sides of the liquid crystal cell so that absorption axes of the respective polarizers were perpendicular to each other. More specifically, the polarizing plates were attached to the liquid crystal cell so that the absorption axis direction of the polarizer of the backlight side polarizing plate became a vertical direction (90° with respect to the longitudinal direction of the liquid crystal panel) and the absorption axis direction of the polarizer of the viewer side polarizing plate became a horizontal direction (0° with respect to the longitudinal direction of the liquid crystal panel). Further, the light diffusing element of Example 1 was transferred from the base material to be attached to the outer side of the viewer side polarizing plate to produce a liquid crystal panel.

Meanwhile, a pattern of a lenticular lens was transferred to one surface of a PMMA sheet by melt thermal transfer using a transfer roll. Aluminum was pattern deposited to a surface (smooth surface) on a side opposite to the surface on which the lens pattern was formed so that light passed through only a focal point of the lens, and thus, a reflective layer having an area ratio of an opening of 7% (area ratio of a reflection portion of 93%) was formed. Thus, a light collecting element was produced. As a light source of a backlight, a cold cathode fluorescent lamp (CCFL of BRAVIA20J, manufactured by Sony Corporation) was used, and the light collecting element was attached to the light source to produce a collimated light source device (backlight unit) emitting collimated light.

The above-mentioned backlight unit was incorporated into the above-mentioned liquid crystal panel to produce a liquid crystal display device of a collimated backlight front diffusing system. A white display and a black display were performed in a dark place in the obtained liquid crystal display device, and the display states were visually observed. As a result, the liquid crystal display device exhibited satisfactory display characteristics in which a black display was dark in a bright place, and brightness of a white display in a dark place was high, when seen from an oblique direction.

Comparative Example 4

A liquid crystal display device was produced in the same way as in Example 11 except for using the light diffusing element of Comparative Example 1. A white display and a black display were performed in a dark place in the obtained liquid crystal display device, and the display states were visually observed. As a result, although brightness of a white display in a dark place was high, a black display in a bright place looked whitish when seen from an oblique direction.

Comparative Example 5

A liquid crystal display device was produced in the same way as in Example 11 except for using the light diffusing element of Comparative Example 2. A white display and a black display were performed in a dark place in the obtained liquid crystal display device, and the display states were visually observed. As a result, although brightness of a white display in a dark place was high, a black display in a bright place looked whitish when seen from an oblique direction.

Example 12

Production of Liquid Crystal Display Device

A liquid crystal display device was produced in the same way as in Example 11 except for using the light diffusing element of Example 2 in place of the light diffusing element of Example 1. In the obtained liquid crystal display device, a white display and a black display were performed in a dark place, and the display states were visually observed. As a result, the liquid crystal display device exhibited satisfactory display characteristics in which a black display was dark in a bright place, and brightness of a white display in a dark place was high, when seen from an oblique direction.

Example 13

Production of Liquid Crystal Display Device

A liquid crystal display device was produced in the same way as in Example 11 except for using the light diffusing element of Example 3 in place of the light diffusing element of Example 1. In the obtained liquid crystal display device, a white display and a black display were performed in a dark place, and the display states were visually observed. As a result, the liquid crystal display device exhibited satisfactory display characteristics in which a black display was dark in a bright place, and brightness of a white display in a dark place was high, when seen from an oblique direction.

<Evaluation>

As is apparent from Table 1, each of the light diffusing elements of Examples, in which a fine uneven-shaped boundary was formed, had a high haze and a low backscattering ratio. Further, each of the light diffusing elements of Examples was very thin with a thickness of 9 μm to 11 μm. In addition, each of the light diffusing elements of Examples exhibited very excellent display characteristics when used as a front diffusing element of a liquid crystal display device of a collimated backlight front diffusing system. On the other hand, the light diffusing element of Comparative Example 1 in which no fine uneven-shaped boundary was formed had a high backscattering ratio while exhibiting a high haze, and the light diffusing element of Comparative Example 2 had a very insufficient haze while exhibiting a low backscattering ratio. Each of the light diffusing elements of Comparative Examples was recognized to have a problem in that a black display became whitish in a bright place when used as a front diffusing element of a liquid crystal display device of a collimated backlight front diffusing system.

INDUSTRIAL APPLICABILITY

The light diffusing element and the polarizing plate with a light diffusing element of the present invention can each be used suitably in a viewer side member of a liquid crystal display device, a member for a backlight of a liquid crystal display device, and a diffusing member for illumination equipment (for example, an organic EL, LED), particularly suitably as a front diffusing element of a liquid crystal display device of a collimated backlight front diffusing system.

REFERENCE SIGNS LIST 10 matrix
11 resin component
12 ultrafine particle component
20 light diffusing fine particle
25 fine uneven-shaped boundary
30 refractive index modulation region
100, 100' light diffusing element
110 polarizer
120 protective layer
130 protective layer
200 polarizing plate with light diffusing element
500 liquid crystal display device

The invention claimed is:

1. A light diffusing element, comprising: a first region having a first refractive index; a second region having a second refractive index, and a refractive index modulation region between the first region and the second region, wherein the refractive index modulation region contains a fine uneven-shaped and spherical shell-shaped boundary formed by the first region and the second region, and a refractive index of material within the refractive index modulation region changes substantially continuously through the refractive index modulation region from the first region to the second region.

2. A light diffusing element, comprising: a matrix; and light diffusing fine particles dispersed in the matrix, wherein two regions having different refractive indices at an interface between the matrix and each of the light diffusing fine particles or in a vicinity thereof form a refractive index modulation region containing a fine uneven-shaped and spherical shell-shaped boundary, and a refractive index of material within the refractive index modulation region changes substantially continuously through the refractive index modulation region between the two regions.

3. A light diffusing element according to claim 2, wherein: the matrix comprises a resin component and an ultrafine particle component; and the fine uneven-shaped and spherical shell-shaped boundary is formed by a region in the matrix in which the ultrafine particle component is dispersed and a region in the matrix in which the ultrafine particle component is not dispersed.

4. A light diffusing element according to claim 2, wherein the fine uneven-shaped and spherical shell-shaped boundary is formed by unevenness of a surface of each of the light diffusing fine particles.

5. A light diffusing element according to claim 2, wherein an average primary particle diameter of the ultrafine particle component is 1 nm to 100 nm.

6. A light diffusing element according to claim 2, wherein the light diffusing element has a haze of 90% to 99.9%.

7. A light diffusing element according to claim 2, wherein the light diffusing element has a thickness of 4 μm to 50 μm.

8. A light diffusing element according to claim 2, wherein the light diffusing element has a light diffusion half-value angle of 10° to 150°.

9. A polarizing plate with a light diffusing element, comprising:
the light diffusing element according to claim 1, and a polarizer.

10. A liquid crystal display device, comprising: a liquid crystal cell; a collimated light source device, which is configured to emit collimated light to the liquid crystal cell; and the light diffusing element according to claim 1, which is configured to transmit and diffuse the collimated light passing through the liquid crystal cell.

11. A polarizing plate with a light diffusing element, comprising:
the light diffusing element according to claim 2 and a polarizer.

12. A liquid crystal display device, comprising: a liquid crystal cell; a collimated light source device, which is configured to emit collimated light to the liquid crystal cell; and the light diffusing element according to claim 2, which is configured to transmit and diffuse the collimated light passing through the liquid crystal cell.

* * * * *